US012789021B2

(12) United States Patent

Turiello

(10) Patent No.: US 12,789,021 B2

(45) Date of Patent: Nov. 10, 2026

(54) METHOD AND SYSTEM OF AIR PARAMETER BASED AUTOMATIC PURGING OF BREATHABLE AIR WITHIN A FIREFIGHTER AIR REPLENISHMENT SYSTEM

(71) Applicant: RESCUE AIR SYSTEMS, INC., San Carlos, CA (US)

(72) Inventor: Anthony J. Turiello, Westlake, TX (US)

(73) Assignee: Rescue Air Systems, Inc., San Carlos, CA (US)

( * ) Notice: Subject to any disclaimer, the term of this patent is extended or adjusted under 35 U.S.C. 154(b) by 566 days.

(21) Appl. No.: 18/211,289

(22) Filed: Jun. 19, 2023

(65) Prior Publication Data

US 2024/0001169 A1 Jan. 4, 2024

Related U.S. Application Data

(60) Provisional application No. 63/427,849, filed on Nov. 24, 2022, provisional application No. 63/427,850, (Continued)

(51) Int. Cl.

| | |
|---|---|
| ***A62B 7/02*** | (2006.01) |
| ***A62B 9/00*** | (2006.01) |

(Continued)

(52) U.S. Cl.

CPC ................ *A62B 15/00* (2013.01); *A62B 7/02* (2013.01); *A62B 9/006* (2013.01); *A62B 27/00* (2013.01); *G08B 21/02* (2013.01)

(58) Field of Classification Search

CPC ........... A62B 15/00; A62B 7/02; A62B 9/006; A62B 27/00; G08B 21/02

See application file for complete search history.

(56) References Cited

U.S. PATENT DOCUMENTS

| | | | |
|---|---|---|---|
| 1,040,311 | A | 10/1912 | Halloran |
| 1,643,155 | A | 9/1927 | Eisenschitz |

(Continued)

FOREIGN PATENT DOCUMENTS

| | | | |
|---|---|---|---|
| AR | 070623 | A1 | 4/2010 |
| AU | 2019101454 | A4 | 1/2020 |

(Continued)

OTHER PUBLICATIONS

Machine translation of KR 101840682 (Year: 2018).*

(Continued)

*Primary Examiner* — Nicolas A Arnett

(74) *Attorney, Agent, or Firm* — Foley & Lardner LLP

(57) ABSTRACT

Disclosed are methods and a safety system of a structure for an air parameter based automatic purging of breathable air within the safety system. In accordance therewith, an air analysis device is coupled within the safety system along an air flow path of the breathable air from the source thereof. The safety system has a fixed piping system installed within the structure for supply of the breathable air across the safety system. A sensor associated with the air analysis device senses a parameter of the breathable air within the safety system. In response to an alert signal indicative of the sensed parameter of the breathable air being outside a predetermined threshold value, a valve and/or a vacuum pump within the safety system automatically purges the safety system of at least a portion of the breathable air.

24 Claims, 14 Drawing Sheets

Related U.S. Application Data filed on Nov. 24, 2022, provisional application No. 63/427,851, filed on Nov. 24, 2022, provisional application No. 63/359,882, filed on Jul. 11, 2022, provisional application No. 63/357,754, filed on Jul. 1, 2022, provisional application No. 63/357,743, filed on Jul. 1, 2022, provisional application No. 63/356,996, filed on Jun. 29, 2022.

(51) Int. Cl.

| | |
|---|---|
| ***A62B 15/00*** | (2006.01) |
| ***A62B 27/00*** | (2006.01) |
| ***G08B 21/02*** | (2006.01) |

(56) References Cited

U.S. PATENT DOCUMENTS 2,341,113 A 2/1944 Nelson
3,429,186 A 2/1969 Price
3,477,688 A 11/1969 Cruse
3,625,065 A 12/1971 Thompson
3,925,763 A 12/1975 Wadhwani et al.
4,014,216 A 3/1977 Thornton
4,023,146 A 5/1977 Carroll
4,091,874 A 5/1978 Monma
4,134,457 A 1/1979 O'Reilly
4,165,738 A 8/1979 Dyer
4,336,590 A 6/1982 Jaco et al.
4,373,522 A 2/1983 Zien
4,375,637 A 3/1983 Desjardins
4,380,187 A 4/1983 Wicks
4,413,622 A 11/1983 Austin
4,467,796 A * 8/1984 Beagley ................. A62B 15/00 128/202.13
4,570,719 A 2/1986 Wilk
4,856,565 A 8/1989 Schoeffl et al.
4,862,931 A 9/1989 Vella
4,905,684 A 3/1990 Heffer
5,095,899 A 3/1992 Green
5,163,422 A 11/1992 Burgess
5,396,885 A 3/1995 Nelson
5,497,855 A 3/1996 Moore
5,507,283 A 4/1996 Grivas
5,538,690 A 7/1996 Greer et al.
5,564,626 A 10/1996 Kettler et al.
5,570,685 A * 11/1996 Turiello ................... A62B 7/00 128/202.13
5,619,333 A 4/1997 Staff et al.
5,707,005 A 1/1998 Kettler et al.
5,720,659 A * 2/1998 Wicks .................... A62B 33/00 454/256
5,730,121 A 3/1998 Hawkins et al.
5,746,976 A 5/1998 Yamada et al.
5,800,260 A * 9/1998 Kao ........................ E04F 17/04 128/202.13
5,901,758 A 5/1999 Hwang et al.
5,979,440 A * 11/1999 Honkonen ......... B01D 53/0454 128/204.15
5,992,532 A 11/1999 Ramsey et al.
6,112,807 A 9/2000 Dage
6,310,552 B1 10/2001 Stumberg et al.
6,357,532 B1 3/2002 Laskaris et al.
6,369,716 B1 4/2002 Abbas et al.
6,401,487 B1 6/2002 Kotliar
6,418,752 B2 7/2002 Kotliar
6,488,026 B2 12/2002 Lauer
6,502,421 B2 1/2003 Kotliar
6,543,444 B1 4/2003 Lewis
6,585,583 B1 7/2003 Chan
6,647,301 B1 11/2003 Sederlund et al.
6,712,071 B1 3/2004 Parker
6,810,910 B2 11/2004 McHugh
6,832,952 B2 12/2004 Faltesek et al.
6,866,102 B2 3/2005 Boyce et al.
6,873,256 B2 3/2005 Pedersen et al.
6,920,874 B1 7/2005 Siegel
6,940,403 B2 9/2005 Kail et al.
6,999,562 B2 2/2006 Winick
7,091,852 B2 8/2006 Mason et al.
7,100,689 B2 9/2006 Williams et al.
7,124,833 B2 10/2006 Sant'Angelo
7,161,481 B2 1/2007 Turner
7,168,428 B1 1/2007 Zoha
7,183,115 B1 2/2007 Lauglin
7,186,084 B2 3/2007 Bunker et al.
7,204,249 B1 * 4/2007 Richey, II .......... B01D 53/0446 128/204.22
7,221,260 B2 5/2007 Berezowski et al.
7,250,000 B2 7/2007 Daniels, II
7,255,104 B2 * 8/2007 Phillips .................. B64D 13/00 128/204.22
7,302,313 B2 11/2007 Sharp et al.
7,347,204 B1 3/2008 Lindsey et al.
7,377,835 B2 5/2008 Parkulo et al.
7,395,704 B2 7/2008 Difoggio
7,468,082 B2 12/2008 Gordon
7,509,968 B2 3/2009 Surawski
7,527,056 B2 * 5/2009 Turiello ................. A62B 13/00 128/204.21
7,548,833 B2 6/2009 Ahmed
7,568,375 B2 8/2009 Sasaki et al.
7,598,856 B1 10/2009 Nick et al.
7,621,269 B2 * 11/2009 Turiello ................. A62B 99/00 128/204.26
7,654,279 B2 2/2010 Horton et al.
7,658,190 B1 2/2010 Phifer et al.
7,673,629 B2 * 3/2010 Turiello .................. E21F 11/00 52/173.3
7,677,247 B2 * 3/2010 Turiello ................... A62B 7/02 52/173.3
7,694,678 B2 * 4/2010 Turiello ................... A62B 7/02 128/204.26
7,710,282 B1 5/2010 Young
7,765,072 B2 7/2010 Eiler et al.
7,770,610 B2 8/2010 Lisle
7,804,402 B2 9/2010 Lang et al.
7,817,050 B2 10/2010 Goodman et al.
7,823,609 B2 11/2010 Wonders
7,857,068 B2 12/2010 Wagner
7,868,752 B1 * 1/2011 Herbold ............. G08B 13/1427 340/988
7,880,607 B2 2/2011 Olson et al.
7,921,869 B2 4/2011 Surawski
7,934,411 B2 5/2011 Koch
7,953,228 B2 5/2011 Faltesek et al.
7,975,729 B2 7/2011 Lisle
8,038,948 B1 10/2011 Laughlin
8,074,278 B2 12/2011 Law et al.
8,077,026 B2 12/2011 Jobe et al.
8,114,954 B2 2/2012 DeBruin
8,116,913 B2 2/2012 Mirpourian et al.
8,147,302 B2 4/2012 Desrochers et al.
8,149,109 B2 4/2012 Lontka
8,196,479 B2 6/2012 Ludwick et al.
8,219,249 B2 7/2012 Harrod et al.
8,291,941 B1 10/2012 Berardi
8,371,295 B2 * 2/2013 Turiello ................. A62B 15/00 128/202.13
8,375,876 B2 2/2013 Van Tassel
8,375,948 B2 * 2/2013 Turiello ................. A62B 13/00 52/173.3
8,381,726 B2 * 2/2013 Turiello ................... A62B 7/02 52/173.3
8,413,653 B2 * 4/2013 Turiello ................. A62B 13/00 52/173.3
8,443,800 B2 * 5/2013 Turiello ................. A62B 25/00 128/204.26
8,517,696 B2 8/2013 McLoughlin et al.
8,538,687 B2 9/2013 Plocher et al.
8,573,317 B2 11/2013 Krüger et al.
8,602,119 B2 12/2013 Wagner
8,611,323 B2 12/2013 Berger et al.

(56) References Cited

U.S. PATENT DOCUMENTS 8,668,023 B2 3/2014 Wilkins et al.
8,701,718 B1 4/2014 Turiello
8,733,355 B2 * 5/2014 Turiello ................. A62B 13/00 128/204.21
8,745,792 B2 6/2014 McGlynn
8,755,839 B2 6/2014 Parkulo et al.
8,770,190 B2 7/2014 Doherty et al.
8,773,946 B2 7/2014 Padmanabhan et al.
8,795,041 B2 8/2014 Saito et al.
8,797,141 B2 8/2014 Best et al.
8,797,210 B2 8/2014 Derrick et al.
8,866,618 B2 10/2014 Cotten et al.
8,995,946 B2 3/2015 Miller
9,010,019 B2 4/2015 Mittelmark
9,032,994 B2 5/2015 McHugh et al.
9,033,061 B2 5/2015 Chattaway et al.
9,080,683 B2 7/2015 Carter et al.
9,105,171 B2 8/2015 Flood et al.
9,109,981 B2 8/2015 Sharp
9,134,284 B1 9/2015 Laughlin
9,175,975 B2 11/2015 Shtukater
9,220,937 B2 12/2015 Wagner
9,234,661 B2 1/2016 Young et al.
9,235,975 B2 1/2016 Gettings et al.
9,242,126 B2 * 1/2016 Turiello ................. A62B 15/00
9,243,753 B2 1/2016 Wonders
9,328,936 B2 5/2016 Meirav et al.
9,347,677 B2 5/2016 Eberlein et al.
9,404,666 B2 8/2016 Terlson et al.
9,466,199 B2 10/2016 McNabb et al.
9,468,157 B2 10/2016 Hu
9,564,028 B2 2/2017 Cerrano
9,566,608 B2 2/2017 Tran
9,670,670 B2 6/2017 Teron
9,671,794 B1 6/2017 Lymberopoulos et al.
9,682,257 B2 6/2017 Zhao et al.
9,702,802 B2 7/2017 Ajay et al.
9,724,484 B2 8/2017 Robey
9,733,149 B2 8/2017 Eberlein
9,829,895 B2 11/2017 McLoughlin et al.
9,852,604 B2 12/2017 Poder
9,875,631 B2 1/2018 Mittleman et al.
9,927,066 B1 3/2018 Wonders
9,933,115 B2 4/2018 Rado et al.
9,964,470 B2 5/2018 Sharp
10,042,164 B2 8/2018 Kuutti et al.
10,044,857 B2 8/2018 Philbin
10,052,509 B2 8/2018 Wagner
10,062,233 B1 8/2018 Rogers et al.
10,074,295 B2 9/2018 Hyman
10,078,865 B2 9/2018 Joshi et al.
10,078,959 B2 9/2018 Rossi et al.
10,121,361 B2 11/2018 Deluliis et al.
10,124,196 B2 11/2018 Roberts
10,139,282 B2 11/2018 Chrostowski
10,156,320 B2 12/2018 Toelle
10,161,923 B1 12/2018 Laughlin
10,192,411 B2 1/2019 Wedig et al.
10,311,444 B1 6/2019 Conboy
10,380,862 B1 8/2019 Heidary
10,380,863 B2 8/2019 Wedig et al.
10,400,442 B2 9/2019 Power et al.
10,417,451 B2 9/2019 Park et al.
10,426,064 B2 9/2019 Slessman et al.
10,490,055 B2 11/2019 Myllymäki
10,503,180 B2 12/2019 Blackley
10,529,215 B2 1/2020 Brown
10,531,538 B2 1/2020 Beghelli
10,563,886 B2 2/2020 McCormick et al.
10,632,331 B2 4/2020 Mele
10,639,508 B2 5/2020 Müller et al.
10,738,943 B2 8/2020 Tilhof
10,787,803 B2 9/2020 Leahy
10,789,665 B2 9/2020 Comello
10,808,396 B2 10/2020 Zhang et al.
10,834,482 B2 11/2020 Speicher et al.
10,890,294 B2 1/2021 Santos et al.
10,901,373 B2 1/2021 Locke et al.
10,969,131 B2 4/2021 Sinha et al.
11,009,186 B2 5/2021 Sung
11,027,236 B2 6/2021 Maayan et al.
11,045,800 B1 6/2021 Kaplan et al.
11,055,973 B2 7/2021 Wedig et al.
11,070,390 B2 7/2021 Park et al.
11,111,767 B2 9/2021 Anders
11,135,461 B2 10/2021 Beechy et al.
11,162,181 B2 11/2021 Harano et al.
11,181,875 B2 11/2021 Kummer et al.
11,185,650 B2 11/2021 Almqvist
11,187,223 B2 11/2021 Ward et al.
11,191,222 B2 12/2021 Cho et al.
11,226,604 B2 1/2022 Goyal
11,238,187 B2 2/2022 Nikolayev et al.
11,391,474 B2 7/2022 Eplee
11,410,539 B2 8/2022 Kasiviswanathan
11,426,553 B2 8/2022 Dube et al.
11,439,856 B2 9/2022 Laskaris et al.
11,514,764 B2 11/2022 Correnti et al.
11,536,476 B2 12/2022 Nesler et al.
11,626,002 B2 4/2023 Donegan et al.
11,719,625 B2 8/2023 Carras et al.
11,768,138 B2 9/2023 Jamison et al.
11,810,216 B1 11/2023 Foiles et al.
11,964,269 B2 4/2024 Kaplan et al.
12,046,125 B2 7/2024 Nalukurthy et al.
12,339,267 B2 6/2025 Lazea et al.
12,345,433 B2 7/2025 Pham et al.
12,411,118 B2 9/2025 Mcmanus et al.
12,440,714 B2 10/2025 Schmitt et al.
2001/0032892 A1 10/2001 Brooks et al.
2002/0121381 A1 9/2002 Reilly
2002/0185283 A1 12/2002 Taylor
2003/0183300 A1 10/2003 Siebert
2004/0045350 A1 3/2004 Jones et al.
2004/0182394 A1 9/2004 Alvey et al.
2005/0066711 A1 3/2005 Discenzo
2005/0280527 A1 12/2005 Farley
2006/0005880 A1 1/2006 Baker et al.
2006/0173579 A1 8/2006 Desrochers et al.
2006/0173580 A1 8/2006 Desrochers et al.
2006/0196254 A1 9/2006 Fjerdingstad et al.
2006/0213513 A1 9/2006 Seong
2006/0234621 A1 10/2006 Desrochers et al.
2007/0017520 A1 1/2007 Gale et al.
2007/0163578 A1 7/2007 Lisle
2007/0175470 A1 8/2007 Brookman et al.
2008/0041377 A1 2/2008 Turiello
2008/0041378 A1 2/2008 Turiello
2008/0041379 A1 2/2008 Turiello
2008/0105443 A1 5/2008 Molz et al.
2008/0236846 A1 10/2008 Gamble et al.
2009/0058669 A1 3/2009 Santos
2009/0159365 A1 6/2009 O'Brien
2009/0178675 A1 7/2009 Turiello
2010/0031955 A1 2/2010 Turiello
2010/0032040 A1 2/2010 Turiello
2010/0081411 A1 4/2010 Montenero
2010/0084043 A1 * 4/2010 Turiello ................. A62B 13/00 141/1
2010/0089489 A1 * 4/2010 Turiello ................. A62B 25/00 141/2
2010/0147297 A1 6/2010 Brewer et al.
2010/0154922 A1 * 6/2010 Turiello ................. A62B 13/00 141/2
2010/0201536 A1 8/2010 Robertson et al.
2011/0030838 A1 * 2/2011 Turiello ................... A62B 7/02 141/1
2011/0187524 A1 8/2011 Cochran, III
2011/0192479 A1 8/2011 Yokota
2011/0259198 A1 10/2011 Kim et al.
2011/0259580 A1 10/2011 Head
2011/0277490 A1 11/2011 Meirav
2012/0031525 A1 2/2012 Wonders
2012/0215488 A1 8/2012 Carter et al.

(56) References Cited

U.S. PATENT DOCUMENTS

| | | | |
|---|---|---|---|
| 2012/0266889 | A1 | 10/2012 | Roberts |
| 2013/0033377 | A1 | 2/2013 | Hoseit |
| 2013/0086933 | A1 | 4/2013 | Holtkamp et al. |
| 2013/0087153 | A1 | 4/2013 | Jung |
| 2013/0105010 | A1 | 5/2013 | McLoughlin |
| 2014/0077110 | A1 | 3/2014 | Gamard et al. |
| 2014/0188286 | A1 | 7/2014 | Hunka |
| 2014/0232876 | A1 | 8/2014 | Dougherty |
| 2014/0261406 | A1 | 9/2014 | Fabian |
| 2014/0338927 | A1 | 11/2014 | Palle |
| 2014/0349707 | A1 | 11/2014 | Bang |
| 2015/0033765 | A1 | 2/2015 | Blalock |
| 2015/0077737 | A1 | 3/2015 | Belinsky et al. |
| 2015/0096768 | A1 | 4/2015 | DuBrucq et al. |
| 2015/0130205 | A1 | 5/2015 | Caskey |
| 2015/0131262 | A1 | 5/2015 | Mabry |
| 2015/0170486 | A1 | 6/2015 | Penland |
| 2015/0204484 | A1 | 7/2015 | Modirzareh et al. |
| 2015/0217518 | A1 | 8/2015 | Chun et al. |
| 2015/0330873 | A1 | 11/2015 | Atchison |
| 2015/0369498 | A1 | 12/2015 | Motomura et al. |
| 2016/0003524 | A1 | 1/2016 | Blalock |
| 2016/0114196 | A1 | 4/2016 | Tribble |
| 2016/0116181 | A1 | 4/2016 | Aultman et al. |
| 2016/0121151 | A1 | 5/2016 | Schmitt et al. |
| 2016/0133108 | A1 | 5/2016 | Bucsa et al. |
| 2016/0136017 | A1 | 5/2016 | Caskey |
| 2016/0138759 | A1 | 5/2016 | Rado et al. |
| 2016/0197772 | A1 | 7/2016 | Britt et al. |
| 2016/0334061 | A1 | 11/2016 | Toelle |
| 2016/0343187 | A1 | 11/2016 | Trani |
| 2017/0006107 | A1 | 1/2017 | Dawes et al. |
| 2017/0084156 | A1 | 3/2017 | Myllymäki |
| 2017/0122580 | A1 | 5/2017 | Karamanos et al. |
| 2017/0180829 | A1 | 6/2017 | Schwarzkopf et al. |
| 2017/0236397 | A1 | 8/2017 | Myslenski et al. |
| 2017/0303580 | A1 | 10/2017 | Cameron et al. |
| 2017/0310498 | A1 | 10/2017 | Brandman et al. |
| 2018/0181094 | A1 | 6/2018 | Funk et al. |
| 2018/0197393 | A1 | 7/2018 | Gallo et al. |
| 2018/0200552 | A1 | 7/2018 | Wertsberger |
| 2018/0243591 | A1 | 8/2018 | DeWitt |
| 2018/0283614 | A1 | 10/2018 | Gandolfo |
| 2018/0363939 | A1 | 12/2018 | Mccormick et al. |
| 2018/0375444 | A1 | 12/2018 | Gamroth |
| 2019/0023529 | A1 | 1/2019 | Lau |
| 2019/0103986 | A1 | 4/2019 | Brandman et al. |
| 2019/0143161 | A1 | 5/2019 | Burkhart et al. |
| 2019/0171780 | A1 | 6/2019 | Santarone et al. |
| 2019/0174208 | A1 | 6/2019 | Speicher et al. |
| 2019/0203885 | A1 | 7/2019 | Sung |
| 2019/0277449 | A1 | 9/2019 | Bourgeois et al. |
| 2019/0282839 | A1 | 9/2019 | Wenzel et al. |
| 2020/0012307 | A1 | 1/2020 | Scelzi |
| 2020/0054905 | A1 | 2/2020 | Livchak et al. |
| 2020/0107475 | A1 | 4/2020 | Keisling et al. |
| 2020/0143300 | A1 | 5/2020 | Weldemariam et al. |
| 2020/0225313 | A1 | 7/2020 | Coles |
| 2020/0232309 | A1 | 7/2020 | Deutch et al. |
| 2020/0294372 | A1 | 9/2020 | Rodriguez |
| 2020/0334778 | A1 | 10/2020 | Lotter |
| 2020/0349661 | A1 | 11/2020 | Dutta et al. |
| 2021/0023323 | A1 | 1/2021 | Wilkinson et al. |
| 2021/0038926 | A1 | 2/2021 | Reedy |
| 2021/0113864 | A1 | 4/2021 | Nam |
| 2021/0183218 | A1 | 6/2021 | Johnson et al. |
| 2021/0237309 | A1 | 8/2021 | Tessien |
| 2021/0241595 | A1 | 8/2021 | Young et al. |
| 2021/0268322 | A1 | 9/2021 | Thomas et al. |
| 2021/0280034 | A1 | 9/2021 | Wedig et al. |
| 2021/0297336 | A1 | 9/2021 | Ramakrishnaiah et al. |
| 2021/0299495 | A1 | 9/2021 | Feenstra et al. |
| 2021/0311008 | A1 | 10/2021 | Hill |
| 2021/0358238 | A1 | 11/2021 | Rogers et al. |
| 2021/0379429 | A1 | 12/2021 | Darnell |
| 2022/0010996 | A1 | 1/2022 | Carrieri |
| 2022/0019186 | A1 | 1/2022 | De Andrade et al. |
| 2022/0099641 | A1 | 3/2022 | Desrochers |
| 2022/0103914 | A1 | 3/2022 | Lotter |
| 2022/0134147 | A1 | 5/2022 | Webb et al. |
| 2022/0233900 | A1 | 7/2022 | Williams |
| 2022/0260270 | A1 | 8/2022 | Abate et al. |
| 2022/0297110 | A1 | 9/2022 | Kaplan et al. |
| 2022/0404056 | A1 | 12/2022 | Bloemer et al. |
| 2023/0034481 | A1 | 2/2023 | Benton et al. |
| 2023/0070772 | A1 | 3/2023 | Bingham et al. |
| 2023/0173128 | A1 | 6/2023 | Slotkin et al. |
| 2023/0298346 | A1 | 9/2023 | Alshammary |
| 2023/0319241 | A1 | 10/2023 | Turiello et al. |
| 2024/0001161 | A1 | 1/2024 | Turiello |
| 2024/0001178 | A1 | 1/2024 | Turiello |
| 2024/0036537 | A1 | 2/2024 | Gupta et al. |
| 2025/0216034 | A1 | 7/2025 | Despres et al. |

FOREIGN PATENT DOCUMENTS

| | | | |
|---|---|---|---|
| AU | 2021105506 | A4 | 11/2021 |
| CA | 2760676 | A1 | 11/2010 |
| CN | 101853549 | A | 10/2010 |
| CN | 101968244 | A | 2/2011 |
| CN | 201775882 | U | 3/2011 |
| CN | 202052220 | U | 11/2011 |
| CN | 202078672 | U | 12/2011 |
| CN | 202615547 | U | 12/2012 |
| CN | 102739786 | B | 4/2013 |
| CN | 101298769 | B1 | 8/2013 |
| CN | 203154649 | U | 8/2013 |
| CN | 203160791 | U | 8/2013 |
| CN | 203190560 | | 9/2013 |
| CN | 102364016 | B | 2/2014 |
| CN | 102500021 | B | 7/2014 |
| CN | 203799482 | U | 8/2014 |
| CN | 102365458 | B | 9/2014 |
| CN | 104056374 | A | 9/2014 |
| CN | 104826248 | A | 8/2015 |
| CN | 204534128 | U | 8/2015 |
| CN | 104906717 | A | 9/2015 |
| CN | 205031799 | U | 2/2016 |
| CN | 104260763 | B | 8/2016 |
| CN | 105917208 | A | 8/2016 |
| CN | 106310553 | A | 1/2017 |
| CN | 106899665 | A | 6/2017 |
| CN | 105143778 | B | 8/2017 |
| CN | 105247269 | A | 9/2017 |
| CN | 206808757 | U | 12/2017 |
| CN | 107991999 | A | 5/2018 |
| CN | 105892538 | B | 8/2018 |
| CN | 207750720 | U | 8/2018 |
| CN | 106546008 | A | 9/2018 |
| CN | 105091097 | B | 1/2019 |
| CN | 105547285 | A | 1/2019 |
| CN | 208536257 | U | 2/2019 |
| CN | 109859368 | A | 6/2019 |
| CN | 109939387 | A | 6/2019 |
| CN | 110469950 | A | 11/2019 |
| CN | 110478804 | A | 11/2019 |
| CN | 110494811 | A | 11/2019 |
| CN | 110673739 | A | 1/2020 |
| CN | 209926530 | U | 1/2020 |
| CN | 210135667 | U | 3/2020 |
| CN | 111210588 | A | 5/2020 |
| CN | 210739978 | U | 6/2020 |
| CN | 111544817 | A | 8/2020 |
| CN | 110047240 | B | 10/2020 |
| CN | 109404582 | B | 11/2020 |
| CN | 112344484 | A | 2/2021 |
| CN | 212491267 | U | 2/2021 |
| CN | 112657081 | A | 4/2021 |
| CN | 108295407 | B | 5/2021 |
| CN | 111258251 | A | 5/2021 |
| CN | 113365029 | A | 9/2021 |
| CN | 110493568 | B | 10/2021 |
| CN | 111243219 | A | 11/2021 |
| CN | 214550694 | U | 11/2021 |

(56) References Cited

FOREIGN PATENT DOCUMENTS

| | | | |
|---|---|---|---|
| CN | 113769292 | A | 12/2021 |
| CN | 113842716 | A | 12/2021 |
| CN | 114146332 | A | 3/2022 |
| CN | 114205385 | A | 3/2022 |
| CN | 114235301 | A | 3/2022 |
| CN | 106678991 | B | 5/2022 |
| CN | 114613092 | A | 6/2022 |
| CN | 216855578 | U | 7/2022 |
| CN | 217526213 | U | 10/2022 |
| CN | 115645769 | A | 1/2023 |
| EP | 2320397 | B1 | 5/2012 |
| EP | 2 151 263 | B1 | 3/2014 |
| EP | 2 982 416 | A1 | 2/2016 |
| EP | 2373384 | B1 | 10/2018 |
| GB | 2248884 | A | 4/1992 |
| JP | H06-343709 | A | 12/1994 |
| JP | H08-124064 | A | 5/1996 |
| JP | 3397382 | B2 | 4/2003 |
| JP | 2004-298554 | A | 10/2004 |
| JP | 2005291634 | A | 10/2005 |
| JP | 5117700 | B2 | 1/2013 |
| JP | 5654124 | B2 | 1/2015 |
| JP | 5719010 | B2 | 5/2015 |
| JP | 6189404 | B2 | 8/2017 |
| JP | 6321134 | B2 | 5/2018 |
| JP | 2021186616 | A | 12/2021 |
| JP | 7109988 | B2 | 8/2022 |
| KR | 20050097400 | A | 10/2005 |
| KR | 100880023 | B1 | 2/2009 |
| KR | 10-2010-0012689 | A | 2/2010 |
| KR | 100945260 | B1 | 3/2010 |
| KR | 10-2010-0115024 | A | 10/2010 |
| KR | 101024944 | B1 | 3/2011 |
| KR | 20110078600 | A | 7/2011 |
| KR | 10-1088547 | B1 | 11/2011 |
| KR | 20110002589 | U | 11/2011 |
| KR | 101089513 | B1 | 12/2011 |
| KR | 101208662 | B1 | 12/2012 |
| KR | 20130017610 | A | 8/2013 |
| KR | 101722045 | B1 | 3/2017 |
| KR | 101747360 | B1 | 6/2017 |
| KR | 101762550 | B1 | 7/2017 |
| KR | 10-1840682 | B1 | 10/2017 |
| KR | 101790694 | B1 | 11/2017 |
| KR | 20170138810 | A | 12/2017 |
| KR | 101815533 | B1 | 1/2018 |
| KR | 101841954 | B1 | 3/2018 |
| KR | 101845263 | B1 | 4/2018 |
| KR | 101845264 | B1 | 5/2018 |
| KR | 101859878 | B1 | 5/2018 |
| KR | 101859955 | B1 | 5/2018 |
| KR | 101887164 | B1 | 9/2018 |
| KR | 101902976 | B1 | 10/2018 |
| KR | 10-2019-0043669 | A | 4/2019 |
| KR | 20180001140 | U | 6/2019 |
| KR | 101996949 | B1 | 7/2019 |
| KR | 102008625 | B1 | 8/2019 |
| KR | 101994222 | B1 | 9/2019 |
| KR | 102035835 | B1 | 10/2019 |
| KR | 10-2019-0131158 | A | 11/2019 |
| KR | 102050539 | B1 | 12/2019 |
| KR | 10-2020-0027390 | A | 3/2020 |
| KR | 102169547 | B1 | 10/2020 |
| KR | 102263178 | B1 | 6/2021 |
| KR | 102277919 | B1 | 7/2021 |
| KR | 102300167 | B1 | 9/2021 |
| KR | 102355909 | B1 | 2/2022 |
| KR | 20220056659 | A | 5/2022 |
| NL | 2019479 | B1 | 8/2018 |
| RU | 74076 | U | 6/2008 |
| RU | 2465933 | C2 | 11/2012 |
| RU | 2717525 | C1 | 3/2020 |
| RU | 2724093 | C1 | 6/2020 |
| TW | 201425832 | A | 9/2015 |
| TW | M540352 | U | 4/2017 |
| WO | 2003031892 | A1 | 4/2003 |
| WO | 2006047246 | A2 | 5/2006 |
| WO | 2008021538 | A2 | 2/2008 |
| WO | 2010063266 | A1 | 6/2010 |
| WO | 2011034334 | A2 | 3/2011 |
| WO | 2014208865 | A1 | 12/2014 |
| WO | 2016205053 | A1 | 12/2016 |
| WO | 2018038434 | A1 | 3/2018 |
| WO | 2018176196 | A1 | 10/2018 |
| WO | 2018236571 | A1 | 12/2018 |
| WO | WO-2021/250389 | A1 | 12/2021 |
| WO | 2022066099 | A1 | 3/2022 |
| WO | 2023000087 | A1 | 1/2023 |

OTHER PUBLICATIONS

International Search Report and Written Opinion for Appl. Ser. No. PCT/IB2024/050603 dated Apr. 24, 2024 (10 pages).

International Search Report and Written Opinion issued in connection with PCT/US2023/014763 dated Jun. 21, 2023 (8 pages).

International Search Report and Written Opinion issued in connection with PCT/US2023/014764 dated Jun. 23, 2023 (9 pages).

International Search Report and Written Opinion issued in connection with PCT/US2023/014765 dated Jun. 27, 2023 (10 pages).

International Search Report and Written Opinion issued in connection with PCT/US2023/017653 dated Jul. 24, 2023 (9 pages).

International Search Report and Written Opinion issued in connection with PCT/US2023/017656 dated Jul. 19, 2023 (10 pages).

International Search Report and Written Opinion issued in connection with PCT/US2023/017803 dated Jul. 24, 2023 (8 pages).

International Search Report and Written Opinion issued in connection with PCT/US2023/018401 dated Jul. 27, 2023 (10 pages).

International Search Report and Written Opinion issued in connection with PCT/US2023/019880 dated Aug. 2, 2023 (8 pages).

International Search Report and Written Opinion issued in connection with PCT/US2023/022222 dated Aug. 24, 2023 (11 pages).

International Search Report and Written Opinion issued in connection with PCT/US2023/022223 dated Sep. 4, 2023 (7 pages).

International Search Report and Written Opinion issued in connection with PCT/US2023/024766 dated Oct. 4, 2023 (7 pages).

International Search Report and Written Opinion issued in connection with PCT/US2023/025646 dated Oct. 11, 2023 (10 pages).

International Search Report and Written Opinion issued in connection with PCT/US2023/025647 dated Oct. 4, 2023 (10 pages).

International Search Report and Written Opinion issued in connection with PCT/US2023/026172 dated Oct. 31, 2023 (9 pages).

International Search Report and Written Opinion issued in connection with PCT/US2023/026174 dated Oct. 20, 2023 (7 pages).

International Search Report and Written Opinion issued in connection with PCT/US2023/026176 dated Oct. 17, 2023 (7 pages).

International Search Report and Written Opinion issued in connection with PCT/US2023/026425 dated Oct. 17, 2023 (12 pages).

International Search Report and Written Opinion issued in connection with PCT/US2023/026428 dated Oct. 17, 2023 (8 pages).

International Search Report and Written Opinion issued in connection with PCT/US2023/026466 dated Nov. 1, 2023 (8 pages).

"Influence of Internal Gas Pipelines Built into the Structure on the Safety of Residents and Energy Eficiency Factors of the Buildings", Published at Latvian Journal of Physics and Technical Sciences, Published on [Oct. 2022] http://surl.li/fdzun.

"Indoor air quality in green buildings: A case-study in a residential high-rise building in the northeastern United States", Published at Journal of Environmental Science and Health, Published on [Feb. 2015] http://surl.li/fdzxk.

"Indoor Air-Quality Data-Monitoring System: Long-Term Monitoring Benefits", Published at MDIP, Published on [Sep. 25, 2019] https://www.mdpi.com/1424-8220/19/19/4157.

"A review of air filtration technologies for sustainable and healthy building ventilation", Published at Sustainable Cities and Society, Published on [Jul. 2017] https://core.ac.uk/download/pdf/84587706.pdf.

(56) References Cited

OTHER PUBLICATIONS

"A novel constant-air-volume range hood for high-rise residential buildings with 2 central shaft", Published at Energy and Buildings, Published on [May 2021] http://surl.li/feadf.
"Thermodynamic performance evaluation of HFC refrigerants for the chiller system simulated by hot gas bypass cycle", Published at ZANCO Journal of Pure and Applied Sciences, Published on [Dec. 28, 2017] http://surl.li/feadr.
"An Automatic and Accurate Localization System for Firefighters", Published at Third International Conference on Internet-of-Things Design and Implementation (IoTDI), Published on [May 28, 2018] https://www.cs.virginia.edu/~stankovic/psfiles/breadcrumb_localization.pdf.
"Fire Safety", Published at Atomic Energy Regulatory Board India, Published on [May 2019] https://aerb.gov.in/images/PDF/fire.pdf.
"Fire Service Features of Buildings and Fire Protection Systems", Published at Occupational Safety and Health Administration (OSHA), Published on [Sep. 8, 2014] https://www.osha.gov/sites/default/files/publications/OSHA3256.pdf.
"A comprehensive review on indoor air quality monitoring systems for enhanced public health", Published at Sustainable Environment Research, Published on [Dec. 2020] https://sustainenvironres.biomedcentral.com/counter/pdf/10.1186/s42834-020-0047-y.pdf.
"Review of research on air-conditioning systems and indoor air quality control for human health", Published at International Journal of Refrigeration, Published on [Jan. 2009] https://sci-hub.hkvisa.net/10.1016/j.ijrefrig.2008.05.004.
"A review of the performance of different ventilation and airflow distribution systems in buildings", Published at Building and Environment, Published on [Dec. 18, 2013] https://www.academia.edu/27228820/A_review_of_the_performance_of_different_ventilation_and_airflow_distribution_systems_in_buildings.
"Real-time sensors for indoor air monitoring and challenges ahead in deploying them to urban buildings", Published at Science of The Total Environment , Published on [Apr. 2016] https://eprints.ncl.ac.uk/file_store/production/223286/749E8E7D-D1EF-4056-BCDD-F48812167CB1.pdf.
"Indoor air quality and energy management through real-time sensing in commercial buildings ", Published at Energy and Buildings, Published on [Jan. 2016] https:/eprints.qut.edu.au/220977/1/93777.pdf.
"Compressors and Compressed Air Systems", Published at Continuing Education and Development, Found on [Mar. 2023] https://www.cedengineering.com/userfiles/Compressors%20and%20Compressed%20Air%20Systems%20R1.pdf.
"HVAC System", Published at Energy Conservation Building Code (ECBC) Tip Sheet, Published on [ Jun. 2009] https://www.keralaenergy.gov.in/files/HVAC_System_Tip_Sheet.pdf.
"Air distribution of oxygen supply through guardrail slot diffusers in high-altitude hypoxic areas", Published at Building and Environment, Published on [Apr. 2020] https://rb.gy/9ktde6.
"Air Quality Control in Mine Refuge Chamber with Ventilation through Pressure Air Pipeline", Published at Process Safety and Environmental Protection, Published on [Dec. 2019] https://uhra.herts.ac.uk/bitstream/handle/2299/23249/Manuscript.pdf; jsessionid=6F0E7E29FB3FF03D59759181BA6A6161?sequence=1.
"Rescue Air for Firefighters", Published at Fire Engineering, Published on [Sep. 8, 2014] https://rescueair.com/wp-content/uploads/2020/03/rescue-air-for-firefighters.whitepaperpdf.render.pdf.
"The Case for Interior High-Rise Breathing Air Systems", Published at Fire Engineering, Published on [Apr. 2012] https://rescueair.com/wp-content/uploads/2014/05/Rush-Article.pdf.
"RF Based Advance Smart Fire Safety System for Industries and Shopping Malls", Published at International Journal of Science and Research (IJSR), Published on [Dec. 2018] https://www.ijsr.net/archive/v7/12/ART20193898.pdf.
"Design and Implementation of Car Fire Detection and Automatic Car Door Opening Using IOT", Published at International Journal of Advances in Engineering and Management (IJAEM), Published on [ Jul. 7, 2022] https://jaem.net/issue_dcp/Design%20and%20Implementation%20of%20Car%20Fire%20Detection%20and%20Automatic%20Car%20Door%20Opening%20Using%20Iot.pdf.
"Machine Vision Based Fire Detection Techniques: A Survey", Published at Springer Nature, Published on [Nov. 27, 2020] https://sci-hub.hkvisa.net/10.1007/s10694-020-01064-z.
"An Analysis of Firefighter Breathing Air Replenishment Systems", Published at Fire Protection Research Foundation , Published o[Apr. 2021] https://www.nfpa.org/-/media/Files/News-and-Research/Fire-statistics-and-reports/Emergency-responders/RFFAnalysisOfFFBARS.pdf.
"Fire Detection Systems in Wireless Sensor Networks", Published at World Conference on Technology, Innovation and Entrepreneurship, Published on [Jul. 3, 2015] https://www.sciencedirect.com/science/article/pii/S1877042815038872.
"Fire Safety System Building", Published at IOP Conference Series: Materials Science and Engineering, Published on [Nov. 2019] https://www.researchgate.net/publication/337402246_Fire_Safety_System_Building/fulltext/5dd573ae299bf11ec866bf2c/Fire-Safety-System-Building.pdf.
"SmartFire: Intelligent Platform for Monitoring Fire Extinguishers and Their Building Environment", Published at MDPI, Published on [May 25, 2019] https://www.mdpi.com/1424-8220/19/10/2390.
"A Smart Fire Detection System using IoT Technology With Automatic Water Sprinkler", Published at International Journal of Electrical and Computer Engineering (IJECE), Published on [Oct. 7, 2020] http://surl.li/esuhn.
"Situational Awareness for first responders: Evaluation of the BIMS field trial", Published at IEEE Xplore, Published on [Dec. 9, 2009] http://surl.li/esuid.
"Fire Safety in Buildings", Published at Journal of Civil & Environmental Engineering, Published on [Jan. 2017] https://www.researchgate.net/profile/Noah-Akhimien/publication/328075851_Fire_Safety_in_Buildings/links/5bb62f01299bf1049b6f57d7/Fire-Safety-in-Buildings.pdf.
"Ignis: Fire Detection and Mitigation System", Published at International Research Journal of Engineering and Technology (IRJET) , Published on [Jun. 6, 2021 ] https://www.irjet.net/archives/V8/16/IRJET-V816493.pdf.
"An Intelligent Fire Detection and Mitigation System Safe from Fire (SFF)s", Published at International Journal of Computer Applications, Published on [Jan. 2016] https://www.ijcaonline.org/research/volume133/number6/mobin-2016-ijca-907858.pdf.
"Smart Fire Alert System Using IOT", Published at International Research Journal of Modernization in Engineering Technology and Science, Published on [Mar. 3, 2022 ] https://www.irjmets.com/uploadedfiles/paper/issue_3_march_2022/20213/final/fin_irjmets1648303966.pdf.
"Johnson Controls Acquires Rescue Air Systems To Enhance Fire Suppression Portfolio", Published at TheBigRedGuide, Published on [Oct. 6, 2022] https://www.thebigredguide.com/docs/opdf/news/johnson-controls-acquires-rescue-air-systems-enhance-fire-suppression-portfolio-co-5246-ga-co-1665048943-ga. 1665049545.pdf.
"5.07 Air Replenishment Systems (2019)", Published at San Francisco Fire Department Bureau of Fire Prevention & Investigation, Found Online on [Feb. 8, 2014] https://sf-fire.org/media/1220/download?inline.
"Summary of Compressed Air Samples from Firefighter Air Replenishment Systems (FARS)", Published at Firefighter Air Coalition, Published on [May 15, 2020] https://aircoalition.org/wp-content/uploads/2021/03/Trace-Analytics-FARS-Air-Quality-Report.pdf.
"Firefighter Air Replenishment Systems (FARS) Air Quality Fact Sheet", Published at Firefighter Air Coalition, Publish Online on [Feb. 8, 2014] https://aircoalition.org/wp-content/uploads/2021/03/FAC-FARS-Air-Quality-White-Paper.pdf.
"Technical Brief on System Controls for Industrial Compressed Air Systems", Published at Compressed Air And Gas Institute, Found Online on [Feb. 15, 2022] https://www.cagi.org/assets/documents/pdfs/SystemControlsTechnicalBrief.pdf?updated=1657712699.
"Case Study—System Controls", Published at Compressed Air And Gas Institute, Found Online on [Feb. 15, 2022] https://www.cagi.org/assets/documents/pdfs/SystemControlsCaseStudy.pdf?updated=1657712699.

(56) References Cited

OTHER PUBLICATIONS

"Technical Brief—Heat Recovery from Industrial Compressed Air Systems", Published at Compressed Air And Gas Institute, Found Online on [Feb. 15, 2022] https://www.cagi.org/assets/documents/pdfs/HeatRecoveryTechnicalBrief.pdf?updated=1657712699.
"Technical Brief on Distribution Piping Network", Published at Compressed Air And Gas Institute, Found Online on [Feb. 15, 2022] https://www.cagi.org/assets/documents/pdfs/DistributionPipingNetworkTechnicalBrief.pdf?updated=1657712699.
"Technical Brief on Pressure Drop", Published at Compressed Air And Gas Institute, Found Online on [Feb. 15, 2022] https://www.cagi.org/assets/documents/pdfs/PressureDropTechnicalBrief.pdf?updated=1657712700.
"Technical Brief on Variable Speed Drive", Published at Compressed Air And Gas Institute, Found Online on [Feb. 15, 2022] https://www.cagi.org/assets/documents/pdfs/VariableSpeed-DriveTechnicalBrief.pdf?updated=1657712699.
"Compressor Room Advantages with Oil-Free Centrifugal Air Compressors", Published at Compressed Air And Gas Institute, Found Online on [Feb. 15, 2022] https://www.cagi.org/pdf/downloads/compressor-room-advantages-with-oil-free-centrifugal-air-compressors.
"Preparing Reciprocating Air Compressors for Winter", Published at Compressed Air And Gas Institute, Found Online on [Feb. 15, 2022] https://www.cagi.org/pdf/downloads/preparing-reciprocating-air-compressors-for-winter.
"Nitrogen Characteristics and Benefits of On-Site Generation", Published at Compressed Air And Gas Institute, Found Online on [Feb. 15, 2022] https://www.cagi.org/pdf/downloads/19-nitrogen-characteristics-and-benefits-of-on-site-generation.
"Key Considerations for Installing Centrifugal Air Compressors", Published at Compressed Air And Gas Institute, Found Online on [Feb. 15, 2022] https://www.cagl.org/pdf/downloads/20-key-considerations-for-installing-centrifugal-air-compressors.
"Compressed Air & Gas Handbook", Published at Compressed Air And Gas Institute, Found Online on [Feb. 15, 2022] https://www.cagi.org/handbook-pdfs/handbook-chapter-1.
"Climate Change: Atmospheric Carbon Dioxide", Published at NOAA Climate, Publish on [Jun. 23, 2022] https://www.climate.gov/news-features/understanding-climate/climate-change-atmospheric-carbon-dioxide.
"Fire Hazard in Buildings: Review, Assessment and Strategies For Improving Fire Safety", Published at Emerald Insight, Publish on [Dec. 28, 2018] https://www.emerald.com/insight/content/doi/10.1108/PRR-12-2018-0033/full/pdf?title=fire-hazard-in-buildings-review-assessment-and-strategies-for-improving-fire-safety.
"Environmental Study Of Firefighters", Published at University of California, Publish on [Sep. 8, 2015] https://sci-hub.hkvisa.net/10.1093/annhyg/35.6.581.
"Summary of human responses to ventilation", Published at California Digital Library University of Clifiornia, Publish on [Jun. 1, 2004] https://escholarship.org/content/qt64k2p4dc/qt64k2p4dc.pdf.
"Fixed Fire Protection Systems in Tunnels:Issues and Directions", Published at Fire Technology, Publish on [Sep. 30, 2010] https://sci-hub.hkvisa.net/10.1007/s10694-011-0220-2.
"Comparison of Underfloor Vs. Overhead Air Distribution Systems in an Office Building", Published at Department of Architecture, Waseda University, Found Online on [Feb. 15, 2022] https://www.airfixture.com/wp-content/uploads/2016/07/ASHRAE-Underfloor-vs-Overhead-Study.pdf.
"General Requirements in piping Design", Published at RMIT University in partnership with Informit Open, Publish on [Jul. 2021] https://search.informit.org/doi/epdf/10.3316/informit.947188479100130.
"Optimal operation of heat supply systems with piping network", Published at Department of Mechanical Engineering, Osaka Prefecture University, Publish on [ Oct. 14, 2016] https://sci-hub.hkvisa.net/10.1016/j.energy.2017.03.146.
"Compressed Air Piping Network Inspection And Documentation For PAROC", Published at Turku University of Applied Sciences, Found Online on [Feb. 15, 2022] https://www.theseus.fi/bitstream/handle/10024/122415/Myllyniemi_Jani.pdf?sequence=1.
"Natural Gas Pipeline Technology Overview", Publish at Argonne National Laboratory, Publish on [ Nov. 2007] https://publications.anl.gov/anlpubs/2008/02/61034.pdf.
"Improving the indoor air quality using the individual air supply system", Publish at Int. J. Environ. Sci. Technol., Publish on [ Jul. 24, 2017] https:/link.springer.com/content/pdf/10.1007/s13762-017-1432-x.pdf?pdf=button.
"Analytical Modeling of Fire Smoke Spread in High-rise Buildings", Publish at Concordia University Montreal, Quebec, Canada Publish on [ Sep. 2016] https://core.ac.uk/download/pdf/211519293.pdf.
"Chapter 6 Fire-Fighting Systems" https://www.globalsecurity.org/military/library/policy/navy/nrtc/14057_ppr_ch6.pdf.
"Research and Perspectives on Fire-Fighting Systems in Tunnels under Strong Piston Wind Action", By Xiaoyi Zhao et al., Published at Construction Management, and Computers & Digitization, Published on [Jan. 31, 2023] https://www.mdpi.com/2075-5309/13/2/435.
"Wireless sensor network applications in monitoring and control of gas networks", By Sajad Balali Dehkordi et al., Published at Majlesi Journal of Telecommunication Devices, Published on [Jun. 23, 2012] https://mjtd.isfahan.lau.ir/article_695667_a4c0e30293098b0ac5497f27c43f5bb9.pdf.
"Sustainability of Air Supply in Areas Immediately Dangerous to Life and Health", By Christopher W. Norris, Published at Northampton Fire Department, MA, Published in [Feb. 2008] https://apps.usfa.fema.gov/pdf/efop/efo41710.pdf.
"Sensor-based safety management", By Amin Asadzadeh et al., Published at Automation in Construction, Published on [Feb. 7, 2020] https://sci-hub.hkvisa.net/10.1016/j.autcon.2020.103128.
"Remote Monitoring and Control Using Mobile Phones", By Dr. Mikael Sjodin, Published at Newline Information, Published in [Nov. 2001] http://www.es.mdh.se/pdf_publications/413.pdf.
"Monitored Performance of an Office Buildingwith an Under-Floor Air Distribution System", By Christine E. Walker et al., Published at Fifth International Conference for Enhanced Building Operations, Pittsburgh, Pennsylvania, Published on [Oct. 13, 2005] https://oaktrust.library.tamu.edu/bitstream/handle/1969.1/5105/ESL-IC-05-10-13.pdf?sequence=4.
"Investigating Accessibility of Social Security System (SSS) Mobile Application: A Structural Equation Modeling Approach", Yung-Tsan Jou, Published at Sustainability 2022, Published on [Jun. 29, 2022] https://www.mdpi.com/2071-1050/14/13/7939.
"Firefighter Fatalities in the US in 2021", By Richard Campbell et al., Published at National Fire Protection Association (NFPA), Published in [Jun. 2023] https://www.nfpa.org/-/media/Files/News-and-Research/Fire-statistics-and-reports/Emergency-responders/osFFF.pdf.
"Reversible Longitudinal Smoke Extraction System in Enclosed Underground Parking Structure", By KongKok Haw, Published at Journal of Advanced Research in Fluid Mechanics and Thermal Sciences, Published on [Mar. 2, 2019] https://www.akademiabaru.com/submit/index.php/arfmts/article/view/2470/1450.
"Mapping Fire and Firefighter Visibility for Improving Situational Awareness", By Katherine Ann Mistick, Published at The University of Utah ProQuest Dissertations, Published in [May 2022] https://www.proquest.com/openview/089c0ac0998979da3b550b77ddee2bf1/1?pq-origsite=gscholar&cbl=18750&diss=y.
"An ultra-wide band indoor personnel tracking system for emergency situations (Europcom)", By Anthony Putorti, Jr. et al., Published at Radar Conference, 2008. EuRAD 2008. European, Published in [Dec. 2008] http://surl.ll/hqxep.
"Threat modeling in smart firefighting systems: Aligning MITR ATT&CK matrix and NIST security controls", Shahzaib Zahid et al., Published at Internet of Things, Published on [Mar. 21, 2023] https://tinyurl.com/msjusd3y.
"Autonomous Fire Suppression Systemfor Use in High and Low VisibilityEnvironments by Visual Servoing", By Joshua G. McNeil

(56) References Cited

OTHER PUBLICATIONS et al., Published at Fire Technology 2016, Published on [ Jan. 7, 2016] https://sci-hub.hkvisa.net/10.1007/s10694-016-0564-8.
"Breathing Limited Air Situational Training Masks (BlastMask) Versus SelfContained Breathing Apparatus (SCBA) for Firefighters: A Pilot Study", By Thomas L. Andre et al., Published at International journal of exercise science, Published in [2019] https://digitalcommons.wku.edu/cgi/viewcontent.cgi?article=2498&context=ijes.
"Internet of Things technology for fire monitoring system", By S.R. Vijayalakshmi et al., Published at International Research Journal of Engineering and Technology (IRJET), Published on [Jun. 6, 2017] https://www.irjet.net/archives/V4/16/IRJET-V416418.pdf.
"Firefighter Safety Using IoT", By Caroline Jebakumari S et al., Published at Recent Trends in Intensive Computing, Published in [Dec. 2021] https://www.researchgate.net/publication/356753949_Firefighter_Safety_Using_IoT/fulltext/61aa2f9e50e22929cd4342f7/Firefighter-Safety-Using-IoT.pdf.
"A smart fire detection system using IoT technology with automatic water sprinkler", By Hamood Alqourabah et al., Published at International Journal of Electrical and Computer Engineering (IJECE), Published on [ Mar. 5, 2021] https://pdfs.semanticscholar.org/f3e7/a7c0cf2d448be592421045033506e845e6c2.pdf.
"Route Planning for Fire Rescue Operations in Long-Term Care Facilities Using Ontology and Building Information Models", By Ru-Guan Wang et al., Published at Building Information Modelling, Semantic Web and Internet-of-Things for Smart Cities, Published on [Jul. 21, 2022] https://www.mdpi.com/2075-5309/12/7/1060?type=check_update&version=2.
Bhatnagar et al., "Machine Learning Techniques to Reduce Error in the Internet of Things," IEEE, 9th International Conference on Cloud Computing, Data Science & Engineering—Confluence—(pp. 403-408).
ENMET—Product Information, "Compressed Airline Monitors & Respiratory Air Monitors & Portable Breathing Air Systems," 2025 (2 pages).
Kinaeva et al., "Machine Learning Algorithms for Regression Analysis and Predictions of Numerical Data," 2021 3rd International Congress on Human-Computer Interaction, Optimization and Robotic Applications, 2021 (pp. 1-6).
Rush III, J.D., "Monitor Your Air Supply" Fire Engineering, 2014 (2 pages).
Trevino, "What Every Firefighter Needs to Know About FARS," Fire Apparatus & Emergency Equipment, 2016 (pp. 1-8).

* cited by examiner

METHOD AND SYSTEM OF AIR PARAMETER BASED AUTOMATIC PURGING OF BREATHABLE AIR WITHIN A FIREFIGHTER AIR REPLENISHMENT SYSTEM

CLAIM OF PRIORITY

This application is a conversion application of, and claims priority to, U.S. Provisional Patent Application No. 63/356,996 titled CLOUD-BASED FIREFIGHTING AIR REPLENISHMENT MONITORING SYSTEM, SENSORS AND METHODS filed on Jun. 29, 2022, U.S. Provisional Patent Application No. 63/427,851 titled AUTOMATED PURGING OF BREATHABLE AIR INSIDE BREATHABLE AIR PIPING UPON CONFIRMATION OF AN ALERT STATUS BY A REMOTE CERTIFICATION LABORATORY ANALYZING AIR QUALITY MARKER DATA CAPTURED USING SENSORS ASSOCIATED WITH A CONTINUAL AIR QUALITY ANALYZER COUPLED WITHIN A FIREFIGHTER AIR REPLENISHMENT SYSTEM filed on Nov. 24, 2022, U.S. Provisional Patent Application No. 63/357,743 titled CONTINUAL AIR QUALITY MONITORING THROUGH LOCALIZED ANALYSIS OF BREATHABLE AIR THROUGH A SENSOR ARRAY filed on Jul. 1, 2022, U.S. Provisional Patent Application No. 63/357,754 titled ON-DEMAND CERTIFICATION THROUGH COMMUNICATION OF ASSOCIATED AIR-QUALITY MARKER DATA TO A REMOTE CERTIFICATION LABORATORY filed on Jul. 1, 2022, U.S. Provisional Patent Application No. 63/359,882 titled REMOTE MONITORING AND CONTROL OF A FIREFIGHTER AIR REPLENISHMENT SYSTEM THROUGH SENSORS DISTRIBUTED WITHIN COMPONENTS OF THE FIREFIGHTER AIR REPLENISHMENT SYSTEM filed on Jul. 11, 2022, U.S. Provisional Patent Application No. 63/427,849 titled AUTOMATIC CLOSURE OF A VALVE IN A BUILDING STRUCTURE TO ISOLATE BREATHABLE AIR SURROUNDING COMPROMISED FLOORS BASED ON SENSORY CAPTURE OF AMBIENT CONDITIONS AROUND FILL PANELS OF A FIREFIGHTER AIR REPLENISHMENT SYSTEM DURING AN EMERGENCY USING A MACHINE LEARNING ALGORITHM OR RESPONSIVE TO A CONTROLLER STATE CHANGE filed on Nov. 24, 2022, and U.S. Provisional Patent Application No. 63/427,850 titled AUTOMATED BYPASS OF STORED BREATHABLE AIR BASED UPON CONFIRMATION OF AN ALERT STATUS BY A REMOTE CERTIFICATION LABORATORY ANALYZING AIR QUALITY MARKER DATA CAPTURED USING SENSORS ASSOCIATED WITH A CONTINUAL AIR QUALITY ANALYZER COUPLED WITHIN A FIREFIGHTER AIR REPLENISHMENT SYSTEM filed on Nov. 24, 2022.

The contents of each of the aforementioned applications are incorporated herein by reference in entirety thereof.

FIELD OF TECHNOLOGY

This disclosure relates generally to emergency systems and, more particularly, to methods and/or a system of air parameter based automatic purging of breathable air within a safety system of a structure.

BACKGROUND

A structure (e.g., a vertical building, a horizontal building, a tunnel, marine craft, a mine) may have a Firefighter Air Replenishment System (FARS) implemented therein. The FARS may be employed to provide pure and safe breathable air to emergency personnel and/or maintenance personnel associated therewith. During contamination of the breathable air through the FARS and/or anomalous levels of components (e.g., carbon monoxide, carbon dioxide) thereof, the emergency and/or the maintenance personnel may be exposed to adverse health and/or life hazards thereto. Also, restoring clean breathable air through the FARS may require dangerous, tedious and/or inefficient operations to be performed.

SUMMARY

Disclosed are methods and/or a system of air parameter based automatic purging of breathable air within a safety system of a structure.

In one aspect, a method of a safety system of a structure having a fixed piping system installed therewithin to supply breathable air from a source across the safety system is disclosed. The method includes sensing a parameter of the breathable air within the safety system. The method also includes, in response to detecting that the parameter of the breathable air is outside a predetermined threshold value based on the sensing, automatically purging the safety system of at least a portion of the breathable air.

In another aspect, a method of a safety system of a structure having a fixed piping system installed therewithin to supply breathable air from a source across the safety system is disclosed. The method includes sensing a parameter of the breathable air within the safety system. The method also includes, in response to detecting that the parameter of the breathable air is outside a predetermined threshold value based on the sensing, automatically bypassing the source of the breathable air with respect to the supply of the breathable air across at least a portion of the safety system, and automatically purging the safety system of at least a portion of the breathable air.

In yet another aspect, a safety system of a structure includes a source of breathable air, and a fixed piping system installed within the structure for supply of the breathable air across the safety system. The safety system also includes an air analysis device along an air flow path of the breathable air from the source thereof. The air analysis device includes a sensor associated therewith to sense a parameter of the breathable air within the safety system. The safety system further includes a valve and/or a vacuum pump to, in response to an alert signal indicative of the sensed parameter of the breathable air being outside a predetermined threshold value, automatically purge the safety system of at least a portion of the breathable air.

Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide methods and/or a system of air parameter based automatic purging of breathable air within a safety system of a structure. Although the present embodiments have been described with reference to specific example embodiments, it will be evident that various modifications and changes may be made to these embodiments without departing from the broader spirit and scope of the various embodiments.

Figure 1A:
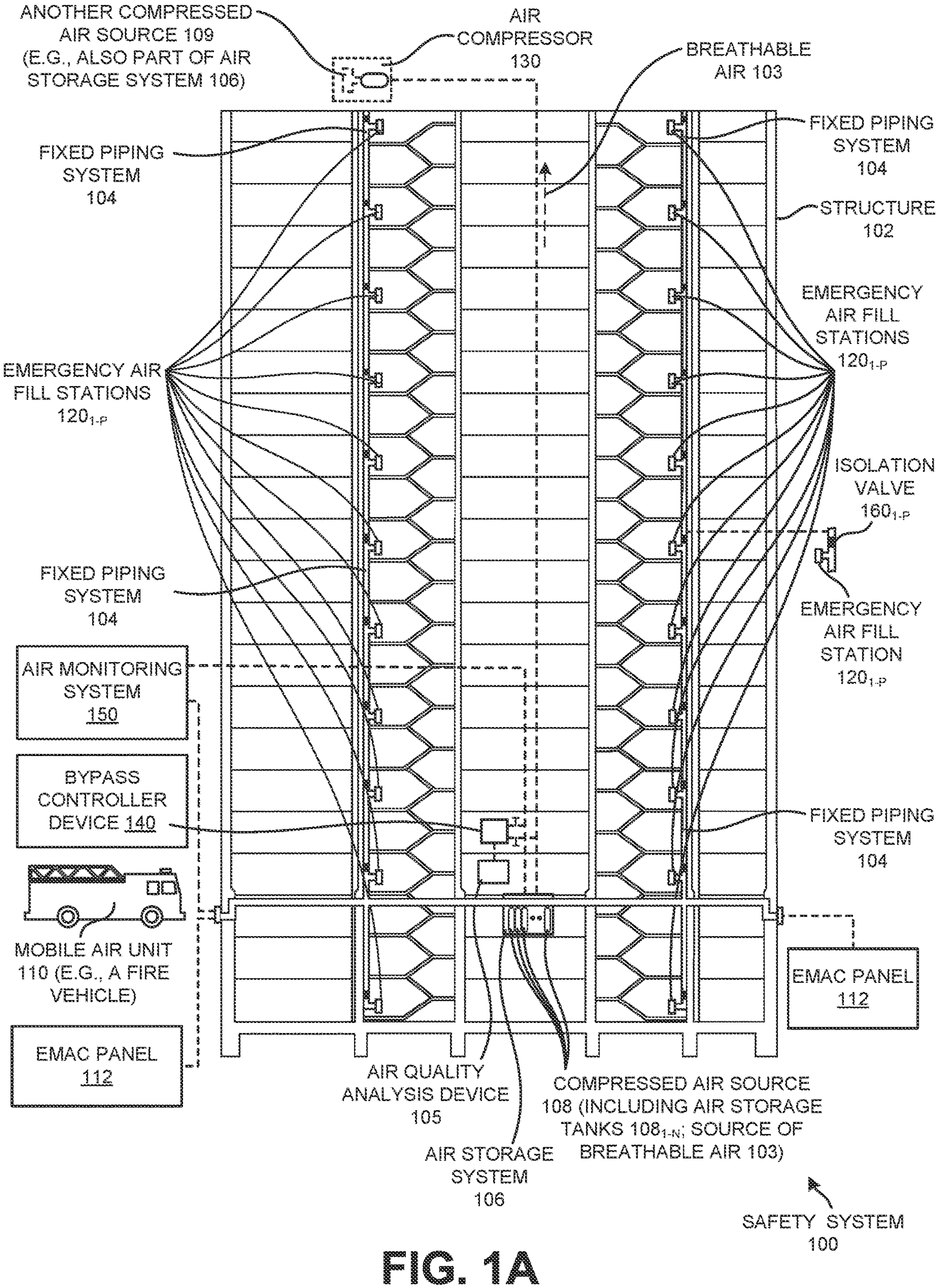
FIG. 1A is a schematic and an illustrative view of a safety system associated with a structure, according to one or more embodiments.

FIG. 1A shows a safety system 100 associated with a structure 102, according to one or more embodiments. In one or more embodiments, safety system 100 may be a Firefighter Air Replenishment System (FARS) to enable firefighters entering structure 102 in times of fire-related emergencies to gain access to breathable (e.g., human breathable) air (e.g., breathable air 103) in-house without the need of bringing in air bottles/cylinders to be transported up several flights of stairs of structure 102 or deep thereinto, or to refill depleted air bottles/cylinders that are brought into structure 102. In one or more embodiments, safety system 100 may supply breathable air provided from a supply of air tanks (to be discussed) stored in structure 102. When a fire department vehicle arrives at structure 102 during an emergency, breathable air supply typically may be provided through a source of air connected to said vehicle. In one or more embodiments, safety system 100 may enable firefighters to refill air bottles/cylinders thereof at emergency air fill stations (to be discussed) located throughout structure 102. Specifically, in some embodiments, firefighters may be able to fill air bottles/cylinders thereof at emergency air fill stations within structure 102 under full respiration in less than one to two minutes.

In one or more embodiments, structure 102 may encompass vertical building structures, horizontal building structures (e.g., shopping malls, hypermarts, extended shopping, storage and/or warehousing related structures), tunnels, marine craft (e.g., large marine vessels such as cruise ships, cargo ships, submarines and large naval craft, which may be "floating" versions of buildings and horizontal structures) and mines. Other structures are within the scope of the exemplary embodiments discussed herein. In one or more embodiments, safety system 100 may include a fixed piping system 104 permanently installed within structure 102 serving as a constant source of replenishment of breathable air 103. Fixed piping system 104 may be regarded as being analogous to a water piping system within structure 102 or another structure analogous thereto for the sake of imaginative convenience.

As shown in FIG. 1A, fixed piping system 104 may distribute breathable air 103 across floors/levels of structure 102. For the aforementioned purpose, fixed piping system 104 may distribute breathable air 103 from an air storage system 106 (e.g., within structure 102) including a number of air storage tanks $\mathbf{108}_{1\text{-}N}$ that serve as sources of pressurized/compressed air (e.g., breathable air 103). Additionally, in one or more embodiments, fixed piping system 104 may interconnect with a mobile air unit 110 (e.g., a fire vehicle) through an External Mobile Air Connection (EMAC) panel 112.

In one or more embodiments, EMAC panel 112 may be a boxed structure (e.g., exterior to structure 102) to enable the interconnection between mobile air unit 110 and safety system 100. For example, mobile air unit 110 may include an on-board air compressor to store and replenish pressurized/compressed air (e.g., breathable air analogous to breathable air 103) in air bottles/cylinders (e.g., utilizable with Self-Contained Breathing Apparatuses (SCBAs) carried by firefighters). Mobile air unit 110 may also include other pieces of air supply/distribution equipment (e.g., piping and/or air cylinders/bottles) that may be able to leverage the sources of breathable air 103 within safety system 100 through EMAC panel 112. Firefighters, for example, may be able to fill breathable air (e.g., breathable air 103, breathable air analogous to breathable air 103) into air bottles/cylinders (e.g., spare bottles, bottles requiring replenishment of breathable air) carried on mobile air unit 110 through safety system 100.

In FIG. 1A, EMAC panel 112 is shown at two locations merely for the sake of illustrative convenience. In one or more embodiments, an air monitoring system 150 may be installed as part of safety system 100 to automatically track and monitor a parameter (e.g., pressure) and/or a quality (e.g., indicated by moisture levels, carbon monoxide levels) of breathable air 103 within safety system 100. FIG. 1A shows air monitoring system 150 as communicatively coupled to air storage system 106 and EMAC panel 112 merely for the sake of example. It should be noted that EMAC panel 112 may be at a remote location associated with (e.g., internal to, external to) structure 102. In one or more embodiments, for monitoring the parameters and/or the quality of breathable air within safety system 100, air monitoring system 150 include appropriate sensors and circuitries therein. For example, a pressure sensor (to be discussed) within air monitoring system 150 may automatically sense and record a pressure of breathable air 103 of safety system 100. Said pressure sensor may communicate with an alarm system that is triggered when the sensed pressure is outside a safety range. Also, in one or more embodiments, air monitoring system 150 may automatically trigger a shutdown of breathable air distribution through safety system 100 in case of impurity/contaminant (e.g., carbon monoxide) detection therethrough yielding levels above a safety/predetermined threshold.

In one or more embodiments, fixed piping system 104 may include pipes (e.g., constituted out of stainless steel tubing) that distribute breathable air 103 to a number of emergency air fill stations $\mathbf{120}_{1\text{-}P}$ within structure 102. In one example implementation, each emergency air fill station $\mathbf{120}_{1\text{-}P}$ may be located at a specific level of structure 102. If structure 102 is regarded as a vertical building structure, an emergency air fill station $\mathbf{120}_{1\text{-}P}$ may be located at each of a basement level, a first floor level, a second floor level and so on. For example, emergency air fill station $\mathbf{120}_{1\text{-}P}$ may be located at the end of the flight of stairs that emergency fighting personnel (e.g., firefighting personnel) need to climb to reach a specific floor level within the vertical building structure.

In one or more embodiments, an emergency air fill station $\mathbf{120}_{1\text{-}P}$ may be a static location within a level of structure 102 that provides emergency personnel 122 (e.g., firefighters, emergency responders) with the ability to rapidly fill air bottles/cylinders (e.g., SCBA cylinders). In one or more embodiments, emergency air fill station $\mathbf{120}_{1\text{-}P}$ may be an emergency air fill panel or a rupture containment air fill station. In one or more embodiments, proximate each emergency air fill station $\mathbf{120}_{1\text{-}P}$, safety system 100 may include an isolation valve $\mathbf{160}_{1\text{-}P}$ to isolate a corresponding emergency air fill station $\mathbf{120}_{1\text{-}P}$ from a rest of safety system 100. For example, said isolation may be achieved through the manual turning of isolation valve $\mathbf{160}_{1\text{-}P}$ proximate the corresponding emergency air fill station $\mathbf{120}_{1\text{-}P}$ or remotely (e.g., based on automatic turning) from air monitoring system 150. In one example implementation, air monitoring system 150 may maintain breathable air supply to a subset of emergency air fill stations $\mathbf{120}_{1\text{-}P}$ through control of a corresponding subset of isolation valves $\mathbf{160}_{1\text{-}P}$ and may isolate the other emergency air fill stations $\mathbf{120}_{1\text{-}P}$ from the breathable air supply. It should be noted that configurations and components of safety system 100 may vary from the example safety system 100 of FIG. 1A.

Figure 1B:
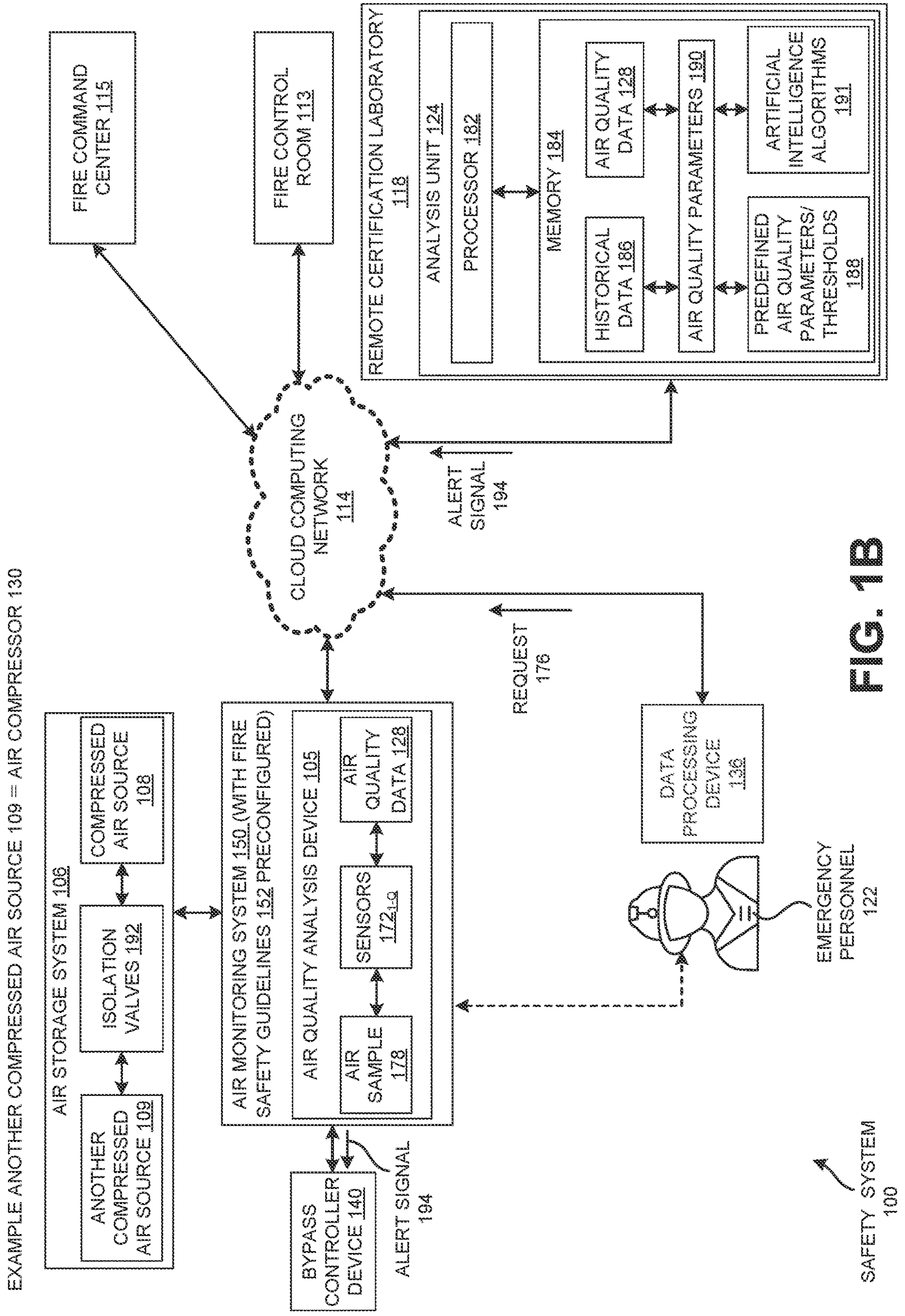
FIG. 1B is a schematic view of the safety system of FIG. 1A integrated with and/or including other components, according to one or more embodiments.

FIG. 1B shows safety system 100 of FIG. 1A integrated with and/or including other components, according to one or more embodiments. In one or more embodiments, safety system 100 shows air storage system 106 discussed above as including air storage tanks $\mathbf{108}_{1\text{-}N}$ (example pressurized/compressed air source shown as compressed air source 108) and air compressor 130. In some embodiments, air compressor 130 may be regarded as another compressed air source 109 internal to or external to structure 102, as will be discussed below. In one or more embodiments, air monitoring system 150 discussed above may include an air quality analysis device 105 (e.g., a programmable electromechanical device) to determine quality of breathable air 103 within safety system 100. In order to do this, in one or more embodiments, air quality analysis device 105 may be communicatively coupled to air storage system 106.

In one or more embodiments, air quality analysis device 105 may continuously and/or intermittently measure and analyze components of breathable air 103 within safety system 100. Further, in one or more embodiments, air quality analysis device 105 may compare the results of the analyses to standard fire safety guidelines 152 pertaining to the breathable air (e.g., breathable air 103) programmed therewithin, as shown in FIG. 1B. Alternatively or additionally, in some embodiments, standard fire safety guidelines 152 may exist on an external device (e.g., data processing device 136 to be discussed below/server) and accessed through air quality analysis device 105.

In one or more embodiments, air quality analysis device 105 may include a set of sensors $\mathbf{172}_{1\text{-}Q}$ to monitor parameters associated with quality of breathable air 103 and components thereof within safety system 100. In one or more embodiments, sensors $\mathbf{172}_{1\text{-}Q}$ may continuously (and automatically be programmed to) monitor the quality of breathable air 103 from air storage system 106 that is being supplied to the various emergency air fill stations $\mathbf{120}_{1\text{-}P}$ within structure 102. In one or more embodiments, once a deviation in an air parameter (e.g., temperature, pressure, contamination, carbon monoxide component, carbon dioxide component etc.) is detected by sensors $\mathbf{172}_{1\text{-}Q}$, air quality analysis device 105 may automatically activate a bypass controller device 140 (e.g., another programmable/controllable electromechanical device) to automatically switch off supply of breathable air 103 from compressed air source 108.

For example, bypass controller device 140 may control isolation valves $\mathbf{160}_{1\text{-}P}$ associated with emergency air fill stations $\mathbf{120}_{1\text{-}P}$ to automatically bypass compressed air source 108 (e.g., air storage tanks $\mathbf{108}_{1\text{-}N}$) with respect to breathable air 103 within safety system 100; appropriate control (e.g., closing) of isolation valves $\mathbf{160}_{1\text{-}P}$ may shut down breathable air 103 from compressed air source 108 to emergency air fill stations $\mathbf{120}_{1\text{-}P}$. Further, in response to the automatic bypass of compressed air source 108, bypass controller device 140 may automatically connect emergency air fill stations $\mathbf{120}_{1\text{-}P}$ to another compressed air source 109 of air storage system 106 as the source of breathable air 103 within safety system 100. Here, in one or more embodiments, isolation valves $\mathbf{160}_{1\text{-}P}$ may, again, be controlled to be, for example, opened to let another compressed air source 109 supply breathable air 103 within safety system 100. Thus, in one or more embodiments, the automatic switching between compressed air sources within safety system 100 may be accomplished through sensing/monitoring of parameters of breathable air 103 therewithin; such a switch may ensure a continuous, uninterrupted supply of breathable air 103 within safety system 100.

In one or more embodiments, the automatic switching between compressed air sources within safety system 100 may occur based on controlling isolation valves 192 associated with compressed air source 108 and another compressed air source 109 within air storage system 106. For example, automatic closing of an isolation valve 192 associated with compressed air source 108 within air storage system 106 and automatic opening of another isolation valve 192 associated with another compressed air source 109 based on detection of deviation in parameters of components of breathable air 103 may result in the automatic switching between compressed air sources within safety system 100. Another compressed air source 109 (e.g., air compressor

130) may be internal to structure 102 or external (e.g., mobile air unit 110 connected to safety system 100 through EMAC panel 112) thereto.

In one or more embodiments, emergency personnel 122 (e.g., firefighters, emergency responders, maintenance personnel, control room personnel) at data processing device 136 (e.g., a mobile phone, a tablet, a server, a laptop, a computing device) may request one or more air quality tests on breathable air 103 through air quality analysis device 105. In one or more embodiments, said request 176 may activate (e.g., automatically) air quality analysis device 105 to obtain an air sample 178 of breathable air 103. For example, air quality analysis device 105 may allow a predetermined quantity/volume of breathable air 103 pass through a chamber (not shown) thereof to enable air sample 178 to be procured for said one or more quality tests. Alternatively or additionally, air quality analysis device 105 may allow breathable air 103 to pass through the chamber for a predetermined duration to enable air sample 178 to be procured for the one or more quality tests.

Figure 2:
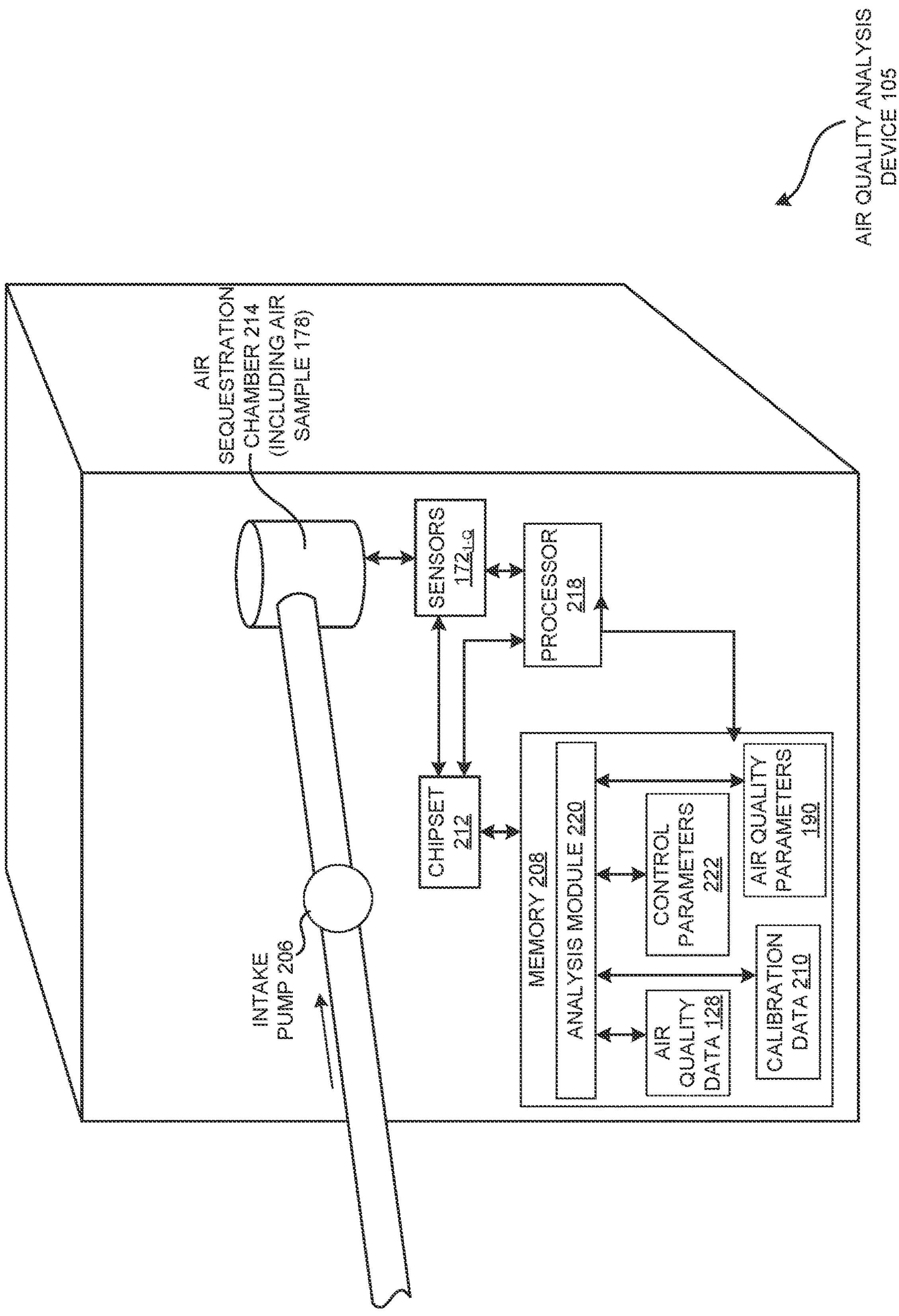
FIG. 2 is a schematic view of an air quality analysis device of the safety system of FIGS. 1A-B, according to one or more embodiments.

FIG. 2 shows air quality analysis device 105, according to one or more embodiments. In some embodiments, air quality analysis device 105 may be integrated with fixed piping system 104 to be along the path of flow of breathable air 103. In other embodiments, air quality analysis device 105 may be part of air monitoring device 150 or even air storage system 106. In some other embodiments, air quality analysis device 105 may merely be along a flow path of breathable air 103 of safety system 100. In one or more embodiments, air quality analysis device 105 may include an intake pump 206 to ingest a quantity/volume of breathable air 103 through fixed piping system 104 into an air sequestration chamber 214, thereby segregating air sample 178 of breathable air 103 for analysis. In one or more embodiments, air sequestration chamber 214 may be communicatively coupled to sensors $\mathbf{172}_{1\text{-}Q}$ that analyze air sample 178 therewithin and perform operations and functionalities related to monitoring and/or sensing parameters related to air quality and components of breathable air 103 within safety system 100.

In one or more embodiments, a chipset 212 coupled to a memory 208 (e.g., a volatile and/or a non-volatile memory) may, in turn, be electrically coupled to sensors $\mathbf{172}_{1\text{-}Q}$ to convert results of the sensing and/or monitoring into machine (e.g., a data processing device such as data processing device 136) readable/interpretatable air quality data 128 (e.g., stored in memory 208); said air quality data 128 may be communicable to a remote certification laboratory 118 (referring back to FIG. 1B) through a computing network (e.g., cloud computing network 114). Thus, in one or more embodiments, analysis and/or certification of breathable air 103 through safety system 100 by professionals may be enabled through safety system 100. As shown in FIG. 2, memory 208 and chipset 212 may be communicatively coupled to a processor 218 (e.g., a microcontroller) that executes instructions associated with the abovementioned operations and/or functionalities. For this purpose, in one or more embodiments, memory 208 may include instructions associated with an analysis module 220 stored therein that are executable through processor 218.

In one or more embodiments, remote certification laboratory 118 may analyze air quality data 128 of air sample 178 and automatically generate an alert signal 194 to activate bypass controller device 140 if anomalies (e.g., due to air contamination, particulates, pollutants, etc.) and/or faults (e.g., deviation from predefined parameters such as temperature, pressure, a proportion of air components, etc.) are detected in air quality data 128. In one or more embodiments, for the aforementioned purpose, bypass controller device 140 may automatically generate signals to control isolation valves $\mathbf{160}_{1\text{-}P}$/isolation valves 192, as discussed above. In addition, in one or more embodiments, air quality data 128 may be communicated to a fire command center 115 (e.g., a remote center with data processing capabilities), a fire control room 113 (e.g., a control room internal to or external to structure 102) and/or emergency personnel 122 at data processing device 136 through cloud computing network 114.

In one or more embodiments, remote certification laboratory 118 alone may not generate alert signal 194. In one or more embodiments, based on monitoring and/or sensing of breathable air 103 and components thereof through air quality analysis device 105 as discussed above, alert signal 194 may be directly generated through air quality analysis device 105, for example, based on an alert system (not shown) implemented therein. As discussed above, in accordance therewith, bypass controller device 140 coupled to air monitoring system 150 may generate signals to automatically bypass air storage system 106 (e.g., compressed air source 108) with respect to supply of breathable air 103 within safety system 100 and/or automatically switch between compressed air sources (e.g., between compressed air source 108 and another compressed air source 109 and/or vice versa).

In one or more embodiments, air quality analysis device 105 may be permanently affixed (or, along a path of breathable air 103 within fixed piping system 104) to fixed piping system 104 to avoid logistical issues related to building an analogous sensing/monitoring mechanism offsite, and/or to reduce the risk of breathing contaminated air causing harm to emergency personnel 122 during an emergency (e.g., air contamination, air pollution, fire, smoke).

In one or more embodiments, as shown in FIG. 2, memory 208 of air quality analysis device 105 may include known calibration data 210 stored therein that is used by processor 218 (e.g., by analysis module 220) to compare a characteristic/parameter of breathable air 103 therewith based on results of analysis through remote certification laboratory 118 and/or air quality analysis device 105. In one or more embodiments, in response to determining through processor 218 that the characteristic/parameter is dissimilar to one or more of known calibration data 210, control parameters 222 (e.g., stored in memory 208) of air quality analysis device 105 may be adjusted to account for said dissimilarities. Also, in one or more embodiments, air quality analysis device 105 may include appropriate circuitry to receive instructions from fire command center 115, fire control room 113 and/or data processing device 136 (emergency personnel 122) to mark/alert safety system 100 for transitioning thereof into an emergency state and/or genera trigger signals to activate bypass controller device 140 for automatic bypass of air storage system 106/compressed air source 108/another compressed air source 109 discussed above. Again, in one or more embodiments, the same functionalities may be provided to air quality analysis device 105 itself.

In one or more embodiments, as shown in FIG. 1B, remote certification laboratory 118 may include an analysis unit 124 (e.g., a data processing device such as a server) including a processor 182 (e.g., a processor core, a network of processors, a processor) communicatively coupled to a memory 184 (e.g., a volatile and/or a non-volatile memory and/or a database). In one or more embodiments, memory 184 may have historical data 186 (e.g., relevant to safety system 100 and breathable air 103 therein) and predefined air quality parameters/thresholds 188 (e.g., as per National Fire Protection Association (NFPA) standards, as per general and/or custom safety standards) for breathable air 103. In one or more embodiments, analysis unit 124 may measure air quality parameters 190 (also shown as part of memory 208 of air quality analysis device 105 to account for air quality analysis device 105 performing operations analogous to analysis unit 124 including triggering bypass controller device 140 to automatic bypass air storage system 106/compressed air source 108/another compressed air source 109 discussed above) using air quality data 128. In some embodiments, analysis unit 124 may execute one or more artificial intelligence algorithms 191 (e.g., stored in memory 184 and executable through processor 182) for advanced profiling and/or testing of breathable air 103 through safety system 100.

In some embodiments, the profiling and/or testing through analysis unit 124 of remote certification laboratory 118 may provide for accreditation of air quality of breathable air 103 within safety system 100 when the results of the profiling/testing yield that air quality parameters 190 are within the predefined air quality parameters/thresholds 188; the aforementioned accreditation may be provided in the form of a certificate to fire command center 115, fire control room 113 and/or data processing device 136 (emergency personnel 122). In some embodiments, each time safety system 100 is certified, the corresponding certification generated may be written permanently into a distributed ledger and/or a blockchain (e.g., Ethereum™ blockchain, Solana™ blockchain; part of memory 184 or a cloud version thereof) for redundant and secondary record-keeping. In addition, advanced reporting, analytics, control and/or test functions may be enabled through a mobile and/or a desktop application (e.g., executing on data processing device 136).

In one or more embodiments, when the results of the profiling/testing yield that air quality parameters 190 are not within predefined air quality parameters/thresholds 188, remote certification laboratory 118/analysis unit 124 may generate alert signal 194 to notify fire command center 115, fire control room 113 and/or data processing device 136 (emergency personnel 122) of an emergency state of safety system 100. In some implementations, alert signal 194 may automatically activate bypass controller device 140 to switch off supply of breathable air 103 from compressed air source 108/another compressed air source 109/air storage system 106 and, thereby, isolate compressed air source 108/another compressed air source 109/air storage system 106 from safety system 100. Alert signal 194 additionally may activate bypass controller device 140 to automatically connect a different compressed air source (e.g., another compressed air source 109) to safety system 100/emergency air fill stations $120_{1-P}$ to ensure a continuous supply of breathable air 103 within safety system 100, according to one or more embodiments.

Figure 3:
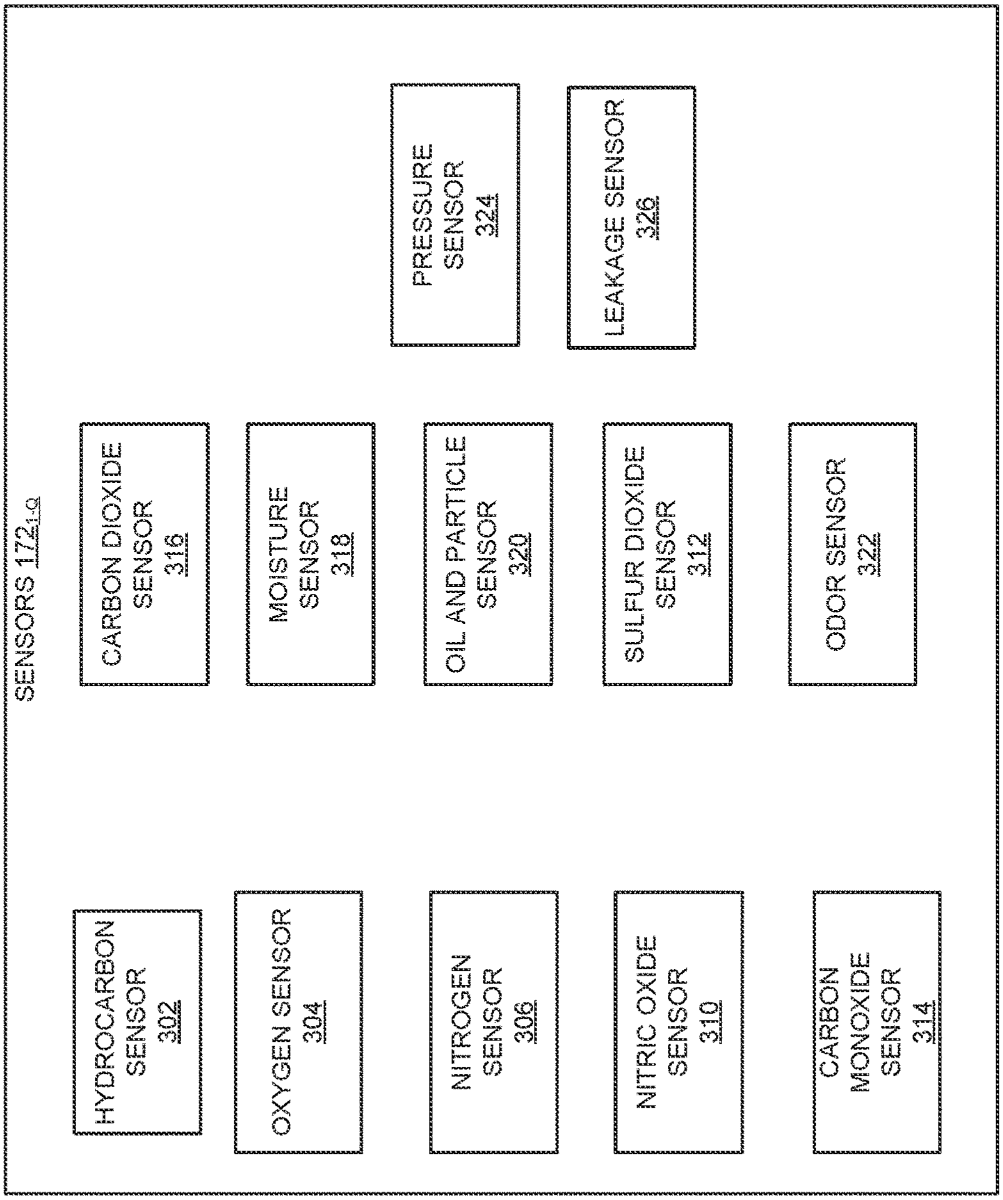
FIG. 3 is a schematic view of example constituent sensors within the air quality analysis device of FIGS. 1A-B and FIG. 2.

FIG. 3 shows constituent sensors of sensors $172_{1-Q}$, according to one or more embodiments. In one or more embodiments, sensors $172_{1-Q}$ may include a hydrocarbon sensor 302 to measure a hydrocarbon level to an accuracy of, say, 0.02-0.3% absolute, an oxygen sensor 304 to measure an oxygen level to an accuracy of, say, 0.1% absolute, a nitrogen sensor 306, a nitric oxide sensor 310, a carbon monoxide sensor 314, a carbon dioxide sensor 316, a moisture sensor 318, an oil and particle sensor 320 to measure a level of oil and/or particle to an accuracy of, say, ±2% relative, a sulfur dioxide sensor 312, a pressure sensor 324, an odor sensor 322 and/or a leakage sensor 326. In one or more embodiments, the automatic bypassing of air storage system 106/compressed air source 106/another compressed air source 109 through bypass controller device 140 may be initiated when one or more of the following conditions are detected through the corresponding sensors $172_{1-Q}$:

1. carbon monoxide sensor 314 detects a level of carbon monoxide in breathable air 103 in excess of a first predetermined threshold value (e.g., 4.5 parts per million; part of predefined air quality parameters/thresholds 188 shown as stored in both memory 184 and memory 208),
2. carbon dioxide sensor 316 detects a .level of carbon dioxide in breathable air 103 in excess of a second predetermined threshold value (e.g., 1,000 parts per million; part of predefined air quality parameters/thresholds 188),
3. oxygen sensor 304 detects a level of oxygen in breathable air 103 outside a predetermined range of values (e.g., between 19.5% and 23.5; part of predefined air quality parameters/thresholds 188),
4. nitrogen sensor 306 detects a level of nitrogen in breathable air 103 less than a third predetermined threshold value (e.g., below 75%; part of predefined air quality parameters/thresholds 188) and/or in excess of a fourth predetermined threshold value (e.g., above 81%; part of predefined air quality parameters/thresholds 188),
5. hydrocarbon sensor 302 detects a condensed hydrocarbon content in breathable air 103 in excess of a fifth predetermined threshold value (e.g., 5 milligrams per cubic meter of breathable air 103; part of predefined air quality parameters/thresholds 188),
6. moisture sensor 318 detects a moisture concentration in breathable air 103 in excess of a sixth predetermined threshold value (e.g., 24 parts per million by volume; part of predefined air quality parameters/thresholds 188), and
7. pressure sensor 324 detects a pressure of breathable air 103 less than a seventh predetermined threshold value (e.g., below 90% of a maintenance pressure specified in a fire code; part of predefined air quality parameters/thresholds 188).

Other types of sensors that are part of sensors $172_{1-Q}$ have analogous predetermined threshold values/ranges (e.g., part of predefined air quality parameters/thresholds 188) associated with air quality parameters 190 sensed therethrough; such sensors $172_{1-Q}$ are shown in FIG. 3 and are self-explanatory. It should be noted that parameters sensed through sensors $172_{1-Q}$ may not be limited to air quality parameters 190; even characteristics such as pressure (e.g., through pressure sensor 324) may be sensed through sensors $172_{1-Q}$. Also, in one or more embodiments, leakage of breathable air 103 from safety system 100 (e.g., fixed piping system 104, at emergency air fill stations $120_{1-P}$, isolation valves $160_{1-P}$, air storage system 106 such as compressed air source 108/air storage tanks $108_{1-N}$/another compressed air source 109) may also be sensed through appropriate sensors $172_{1-Q}$ (e.g., leakage sensor 326). In one example implementation, leakage sensor 326 may be an ultrasound sensor that senses high sound frequencies of leaks of breathable air 103. Said leaks, if not addressed appropriately, may result in catastrophic loss of breathable air 103 from safety system 100. In one or more embodiments, once sensors $172_{1-Q}$ detect the leakage of breathable air 103, again, bypass controller device 140 may automatically be triggered to bypass air storage system 106/compressed air source 108/another compressed air source 109, as discussed above.

Thus, in one or more embodiments, the capabilities of air quality analysis device 105 and/or remote certification laboratory 118 may be extended to accommodate detection of parameters such as pressure and leakage of breathable air 103. All reasonable variations are within the scope of the exemplary embodiments discussed herein.

Figure 4:
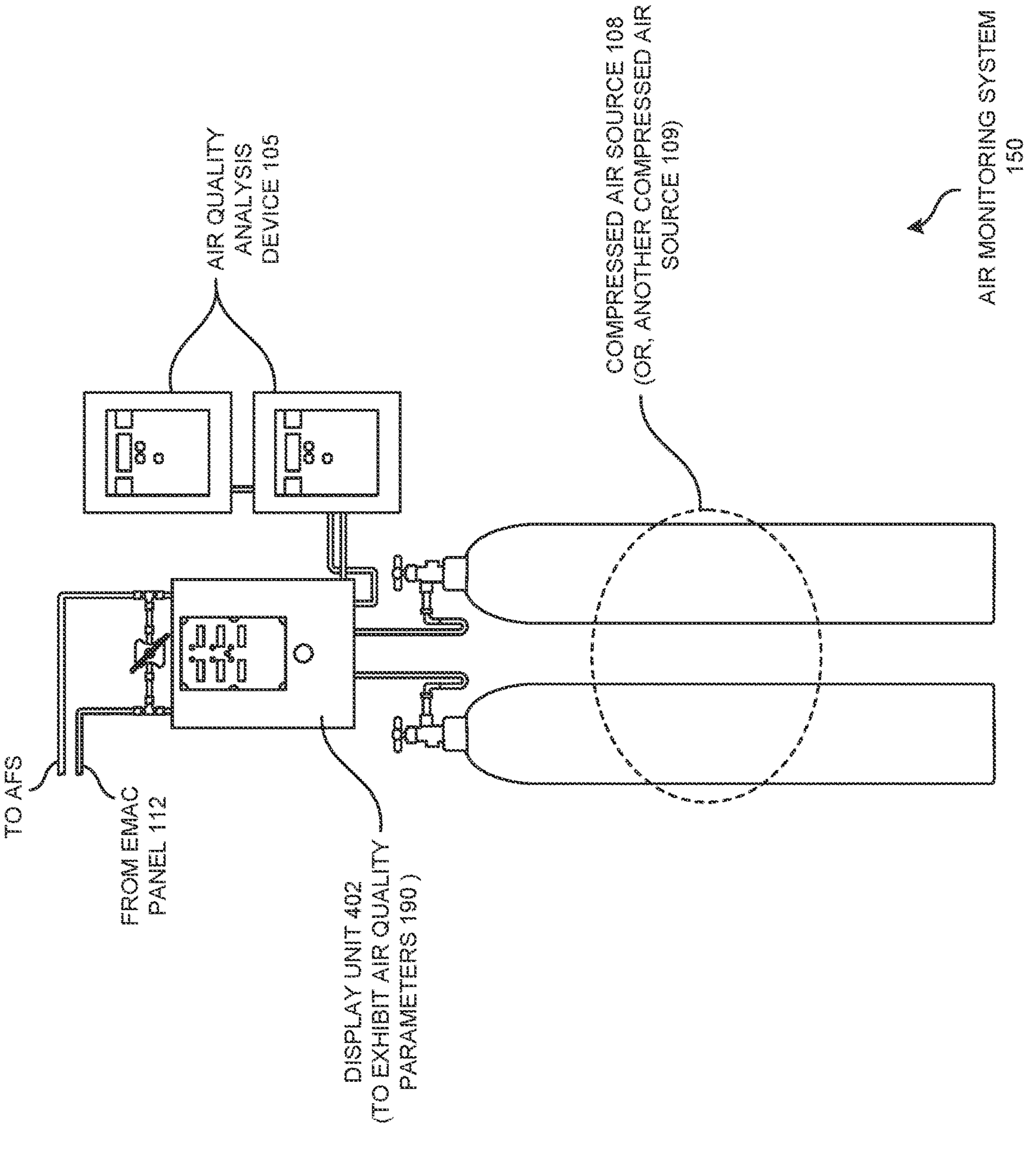
FIG. 4 is a schematic and an illustrative view of an example air monitoring system of the safety system of FIGS. 1A-B.

FIG. 4 shows air monitoring system 150 discussed above in an example implementation form. Here, air monitoring system 150 may be a collection of units and/or components put together to check and record quality (and/or pressure/leakage) of breathable air 103 and components thereof within safety system 100. Air quality analysis device 105 may include a display unit 402 associated therewith (e.g., part of or external to air quality analysis device 105). to exhibit air quality parameters 190 captured and/or analyzed through air quality analysis device 105. Display unit 402 may be part of an Android™-based data processing device (e.g., a tablet, a notebook) with a touchscreen for visual presentation of air quality parameters 190.

Display unit 402, as discussed herein, may be an electromechanical device installed at key locations of structure 102, and air quality analysis device 105 may be made of one or more material(s) having fire-rated capabilities. A video camera (not shown) installed on or integrated with display unit 402 may capture visual incidents at the key locations that are accessible at fire command center 115, fire control room 113 and/or data processing device 136 through cloud computing network 114. Air quality parameters 190 may be monitored in accordance with standard fire safety guidelines (e.g., NFPA guidelines, Occupational Safety and Health Administration (OSHA) and/or Compressed Gas Association (CGA) standards).

Figure 5:
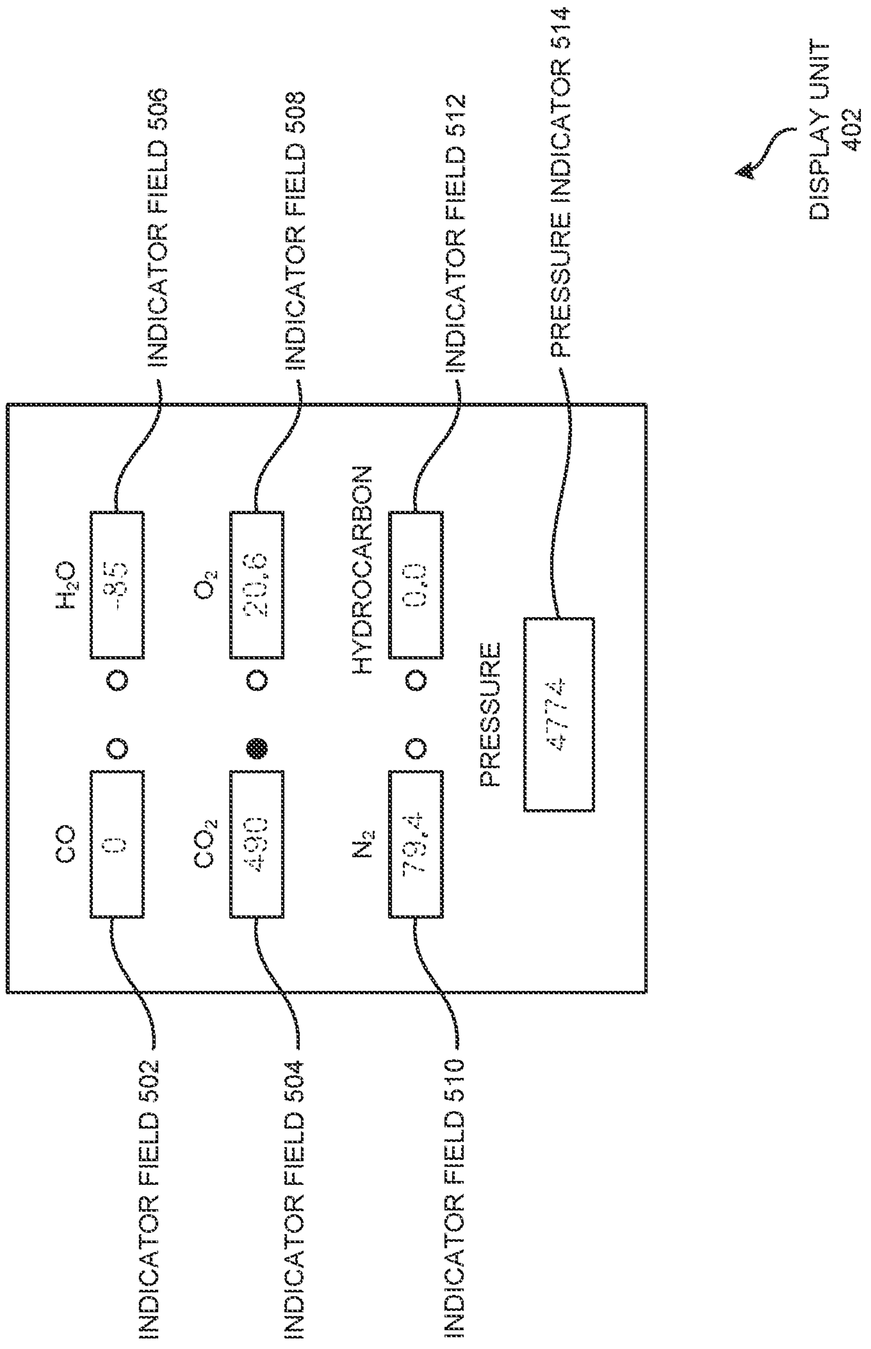
FIG. 5 is a schematic and an illustrative view of an example display unit associated with the air quality analysis device of the air monitoring system of FIG. 4.

FIG. 5 shows an example display unit 402 associated with air quality analysis device 105 of FIG. 4. Display unit 402 may include various indicator fields to exhibit air quality parameters 190 captured and/or analyzed by air quality analysis device 105 in real-time. For example, indicator field 502 pray be associated with carbon monoxide content in breathable air 103 (e.g., from air storage system 106/compressed air source 108), indicator field 504 may be associated with carbon dioxide content in breathable air 103, indicator field 510 may be associated with nitrogen content in breathable air 103, indicator field 506 may be associated with moisture content in breathable air 103, indicator field 508 may be associated with oxygen content n breathable air 103, and indicator field 512 may be associated with hydrocarbon content in breathable air 103. In addition, display unit 402 may include a pressure indicator 514 to exhibit air pressure of breathable air 103 (e.g., air sample 178).

Further, display unit 402 may include indicator lights (not shown) to indicate changes in air quality parameters 190. through changes in colors of lights emitted therefrom. Still further, display unit 402 may include, for example, a Quick Response (QR) scanner (not shown) to enable emergency personnel 122 to scan and check statuses of air quality parameters 190.

Figure 6:
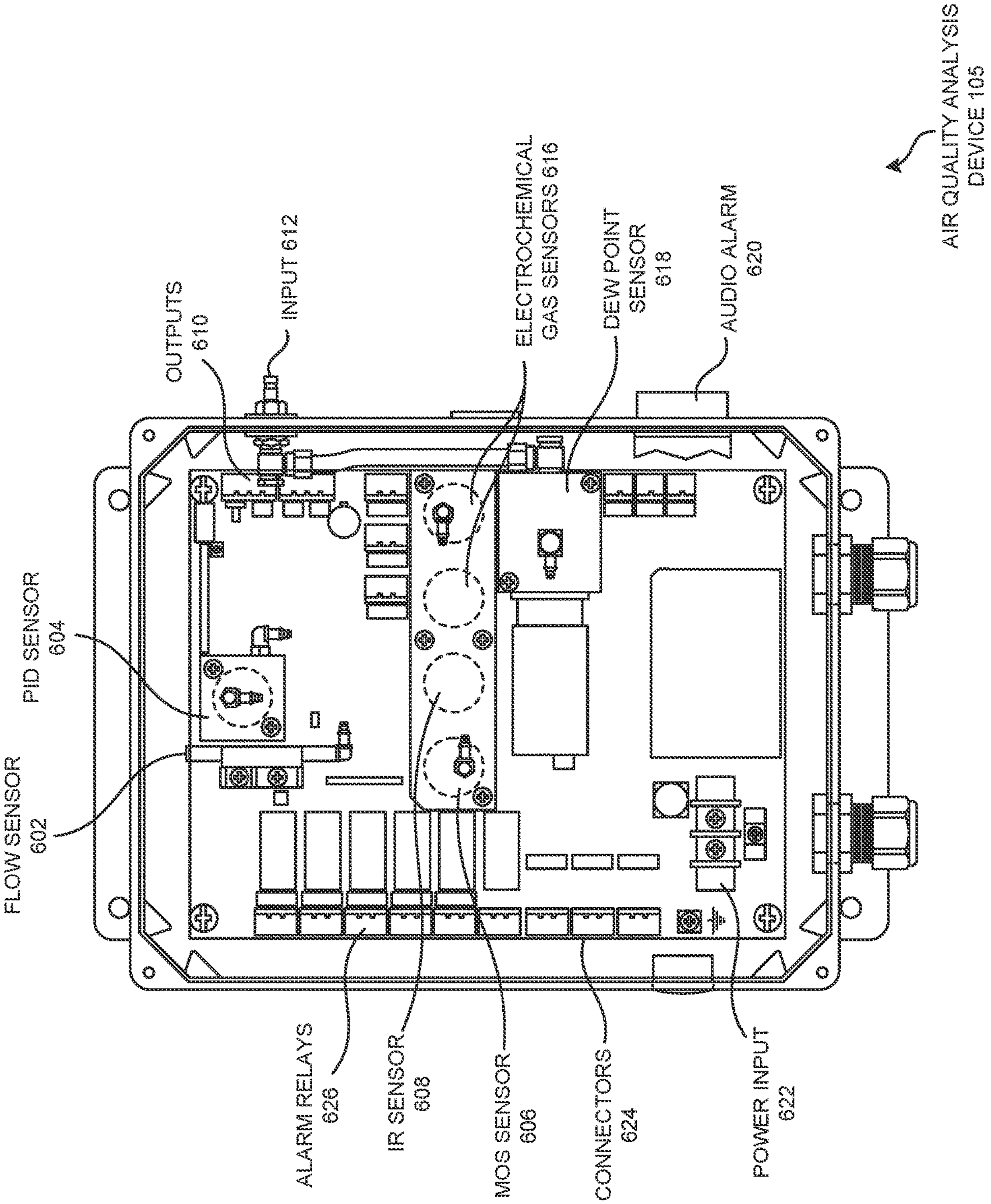
FIG. 6 is a schematic and an illustrative view of an example air quality analysis device of the safety system of FIGS. 1A-B.

FIG. 6 shows an example air quality analysis device 105. Air quality analysis device 105 may include a flow sensor 602 (e.g., an electronic device) that measures and/or regulates a flow rate of breathable air 103 (e.g., from compressed air source 108, another compressed air source 109) within fixed piping system 104. A photo ionization detector (PID) sensor 604 of air quality analysis device 105 may detect low concentrations of volatile organic compounds (VOCs)/hazardous substances in breathable air 103. In one example implementation, PID sensor 604 may utilize ultraviolet (UV) light to break down said VOCs in breathable air 103 into positive and negative ions, following which a charge of the ionized gas as a function of concentration of the VOCs in breathable air 103 is detected and/or measured.

A Metal Oxide Semiconductor (MOS) sensor 606 of air quality analysis device 105 may detect concentrations of various types of gases in breathable air 103/air sample 178 by measuring a change in resistance of a metal oxide due to adsorption of gases in breathable air 103/air sample 178. An infrared (IR) sensor 608 of air quality analysis device 105 may measure and/or detect infrared radiation in a surrounding environment of air quality analysis device 105. All sensors discussed herein may be part of sensors $172_{1-Q}$ discussed above.

Outputs 610 may be in the form of electrical signals used to identify air components of breathable air 103/air sample 178. The electrical signals may be generated by sensors $172_{1-Q}$ including the sensors discussed herein. An input 612 may be an intake of breathable air 103/air sample 178 (e.g., through a hose) from compressed air source 108/another compressed air source 109/air storage system 106.

An electromechanical gas sensor 616 of air quality analysis device 105 may be operated based on a diffusion of a gas of interest (e.g., air components of breathable air 103/air sample 178) thereinto. Said diffusion may result in generation of an electrical signal proportional to a concentration of the gas of interest. A dew point sensor 618 of air quality analysis device 105 may be used to measure and/or monitor a dew point temperature of breathable air 103/air sample 178. An audio alarm 620 may be a transducer device to emit an audible alert once an emergency state is detected by sensors $172_{1-Q}$. A power input 622 may be an input corresponding to an amount of energy put into and/or consumed by air quality analysis device 105. Connectors 624 may be links between electrical components of air quality analysis device 105.

An alarm relay 626 may be an electric switch that activates bypass controller device 140 when anomalies (e.g., contamination in breathable air 103) and/or faults (e.g., fire hazards, pressure variations, deviation in predefined air/air quality parameters, etc.) are detected by sensors $172_{1-Q}$, following which bypass controller device 140 may enable automatic bypassing of air storage system 106/compressed air source 108/another compressed air source 109 as discussed above. In one or more embodiments, air monitoring system 150 may be made of fire-rated material to protect safety system 100 from physical damage during hazardous situations. Further, in one or more embodiments, air monitoring system 150 may be made of weather-resistant and/or UV/solar/infrared radiation-resistant material/material(s) to prevent corrosion and/or deterioration of components thereof due to prolonged exposure to harsh environmental and/or weather conditions.

Figure 7:
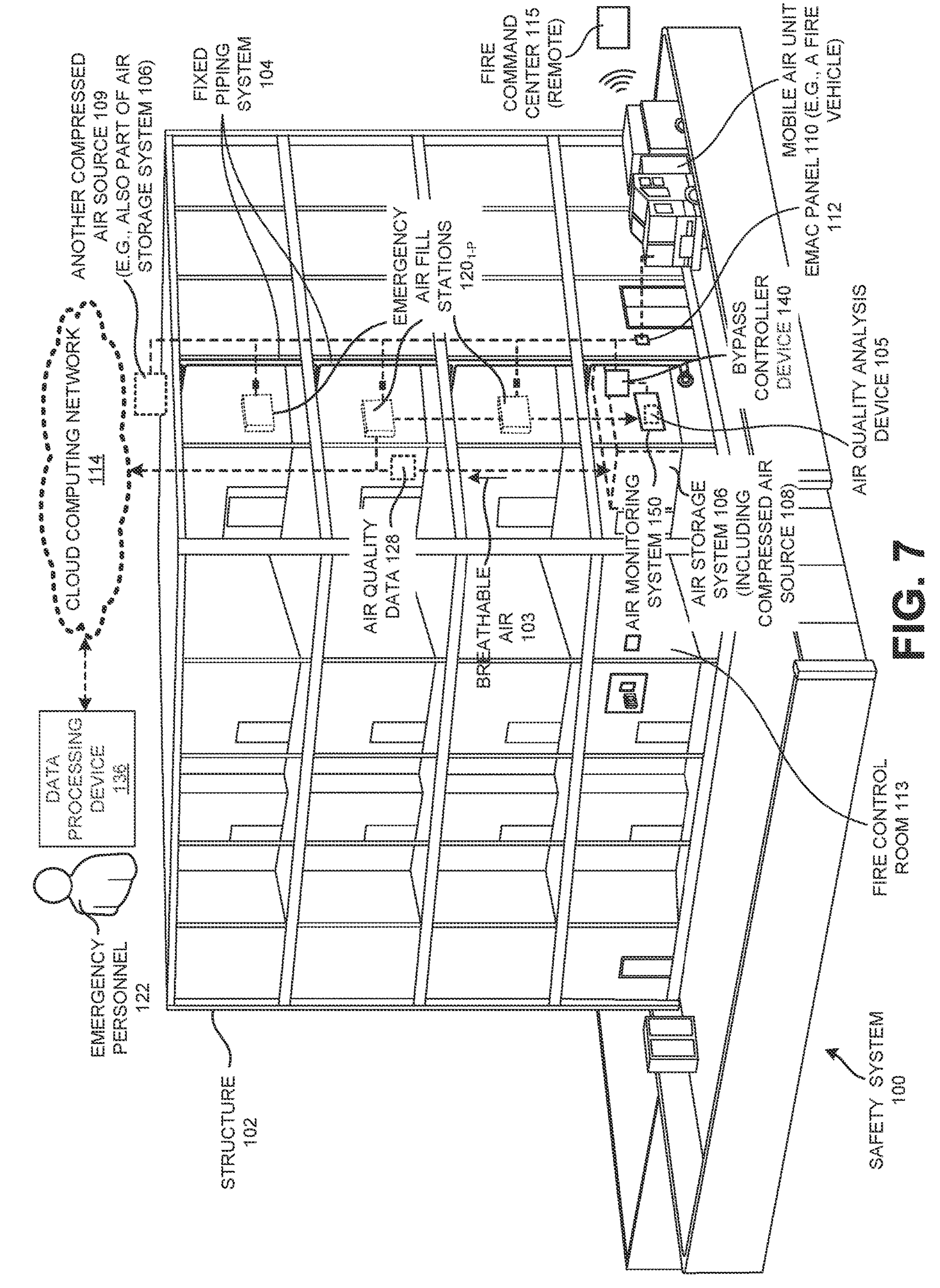
FIG. 7 is a schematic and an illustrative view of the safety system of FIGS. 1A-B implemented in a horizontal configuration of the structure thereof and communication therewithin, according to one or more embodiments.
Figure 8:
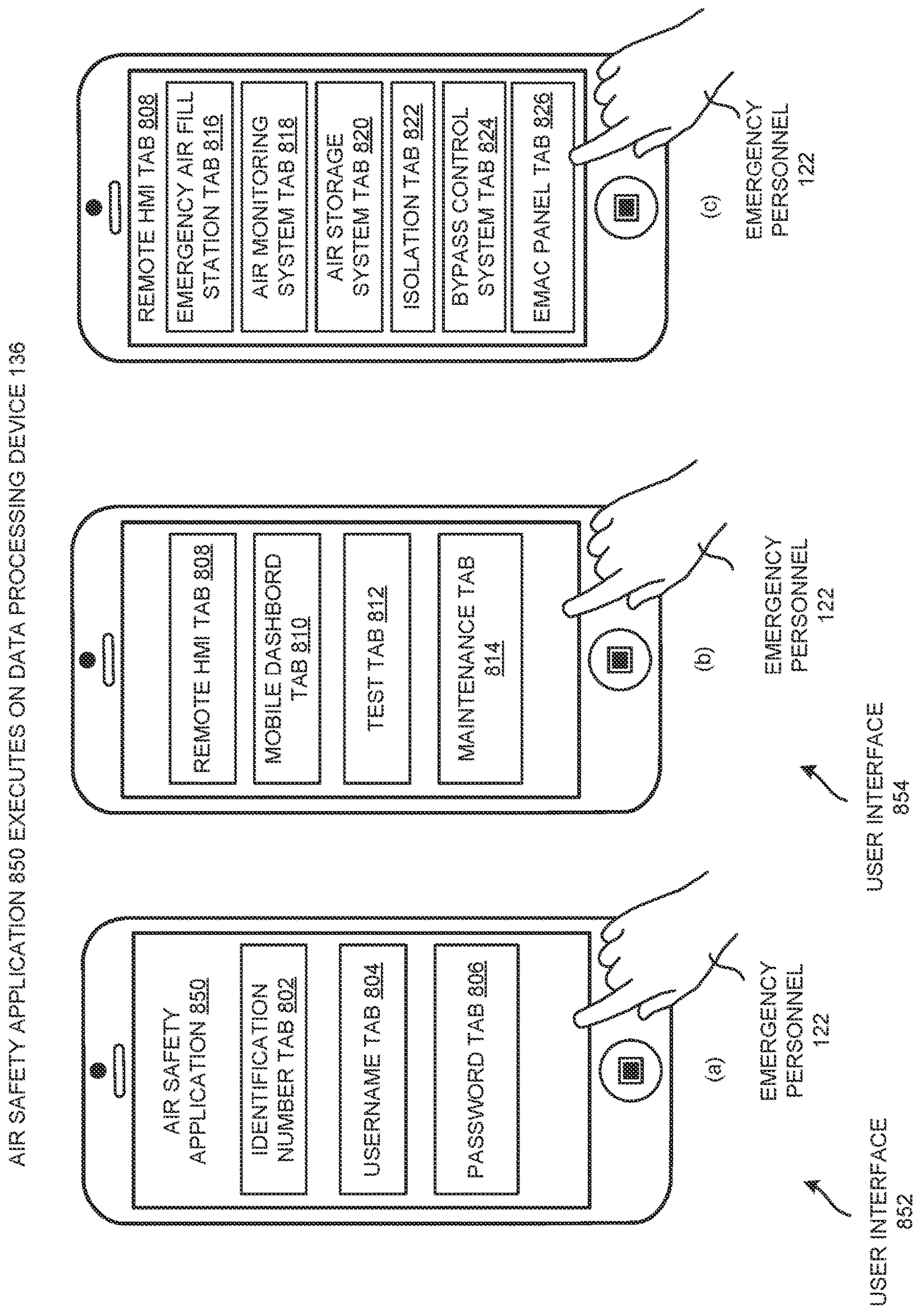
FIG. 8 is an example user interface view of an air safety application executing on a data processing device of FIG. 1B and FIG. 7.

FIG. 7 shows safety system 100 implemented in a horizontal configuration of structure 102 and communication therewithin, according to one or more embodiments. All concepts discussed in this Application may also be applicable to FIG. 7. FIG. 8 shows an example user interface 852 of an air safety application 850 executing on data processing device 136 (e.g., on a processor communicatively coupled to a memory thereof). As shown in '(a)', user interface 852 may display user authentication tabs of air safety application 850. Example user authentication tabs may include an identification number tab 802, a username tab 804, and a password tab 806. Emergency personnel 122 (e.g., authorized users, firefighters, emergency responses) may need to enter a corresponding identification number, username and password to access features provided through air safety application 850.

As shown in '(b)', upon authentication, example user interface 854 may display a remote Human-Machine Interface (HMI) tab 808, a mobile dashboard tab 810, a test tab 812, and a maintenance tab 814. Remote HMI tab 808 may help emergency personnel 122 to remotely control safety system 100. Mobile dashboard tab 810 may help show a real-time graphical display of an entirety of safety system 100. Test tab 812 may help emergency personnel 122 to request analysis of breathable air 103 through remote certification laboratory 118 and generate custom reports. Maintenance tab 814 may help provide a proactive dimension to view upcoming and/or current maintenance requirements of safety system 100.

As shown in '(c)', remote HMI tab 808 may display an emergency air fill station tab 816, an air monitoring system tab 818, an air storage system tab 820, an isolation tab 822, a bypass control system tab 824, and an EMAC panel tab 826. Remote HMI tab 808 may enable emergency personnel 122 to control components associated with the aforementioned tabs to effect automatic bypass of air storage system 106/compressed air source 108/another compressed air source 109, as discussed above, and obtain air quality parameters 190. Based on zeroing in on specific tabs discussed herein, more detailed operations such as controlling relay devices, requesting certification through remote certification laboratory 118, purging breathable air 103 from safety system 100, isolating compressed air source 108/another compressed air source 109/air storage system 106 and so on are within the scope of the exemplary embodiments discussed herein.

In one or more embodiments, based on detection of emergency state(s) of safety system 100 and/or anomalous air quality parameters 190 through sensors $\mathbf{172}_{1\text{-}Q}$ via data processing device 136, fire command center 115 and/or fire control room 113, emergency personnel 122 may be able to purge safety system 100 of contaminated/bad/anomalous breathable air 103 prior to switching from one compressed air source (e.g., compressed air source 108) to another compressed air source (e.g., another compressed air source 109). In some other embodiments, leakage (e.g., detected through leakage sensor 326) of breathable air 103 may require plugging in of leak(s) in components of safety system 100 and/or fixing said components prior to reuse of the same compressed air source (e.g., air storage system 106, compressed air source 108, another compressed air source 109). The aforementioned tasks are instantaneously notified to emergency personnel 122 in accordance with one or more implementations of safety system 100 discussed herein. All reasonable variations are within the scope of the exemplary embodiments discussed herein.

Figure 9:
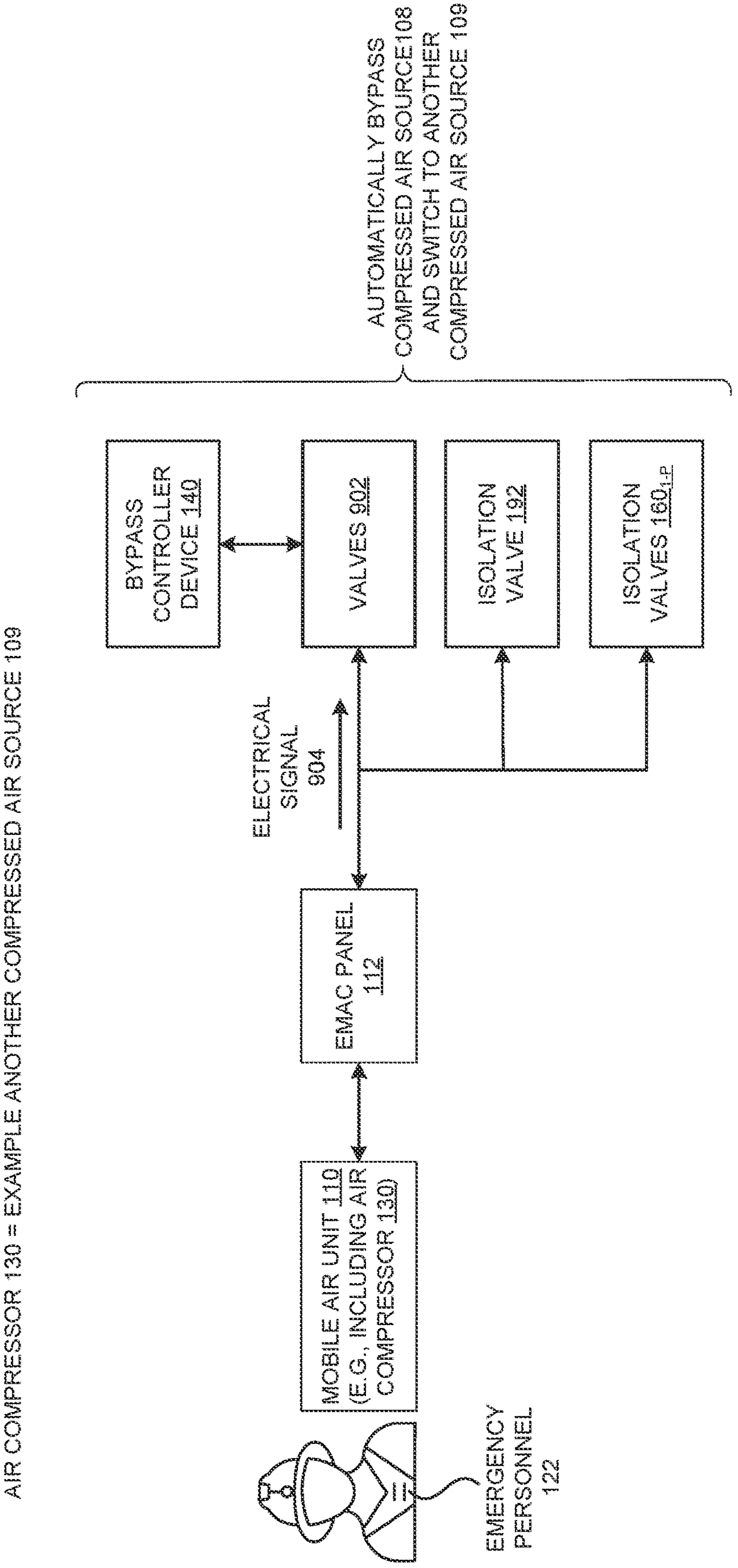
FIG. 9 is a schematic view of control of valves remotely from an External Mobile Air Connection (EMAC) panel of the safety system of FIG. 1B and FIG. 7, according to one or more embodiments.

It should be noted that, in one or more embodiments, in the case of another compressed air source 109 being mobile air unit 110 with air compressor 130, bypass controller device 140 may be implemented with one or more check valves and/or one or more automatic actuator selector valves remotely operable from EMAC panel 112 readily accessible by emergency personnel 122. FIG. 9 shows control of valves 902 (e.g., check valves, automatic actuator selector valves) implemented in conjunction with bypass controller device 140/isolation valve 192/isolation valves $\mathbf{160}_{1\text{-}P}$ remotely from EMAC panel 112 by emergency personnel 122, according to one or more embodiments. In one or more embodiments, in response to an electrical signal 904 from EMAC panel 112 (e.g., following detection of anomalies/faults in air quality parameters 190), valves 902/isolation valve 192/isolation valves $\mathbf{160}_{1\text{-}P}$ may be controlled to enable automatic bypass/isolation of compressed air source 108 with respect to breathable air 103 within safety system 100 and automatic switching to another compressed air source 109 (e.g., air compressor 130 on mobile air unit 110) to ensure direct and continued supply of breathable air 103 from another compressed air source 109 within safety system 100. In the case of control of isolation valve 192/isolation valves $\mathbf{160}_{1\text{-}P}$ through electrical signal 904, isolation valve 192 and/or isolation valves $\mathbf{160}_{1\text{-}P}$ may also be implemented with check valves and/or automatic actuator selector valves. All reasonable variations are within the scope of the exemplary embodiments discussed herein.

Figure 10:
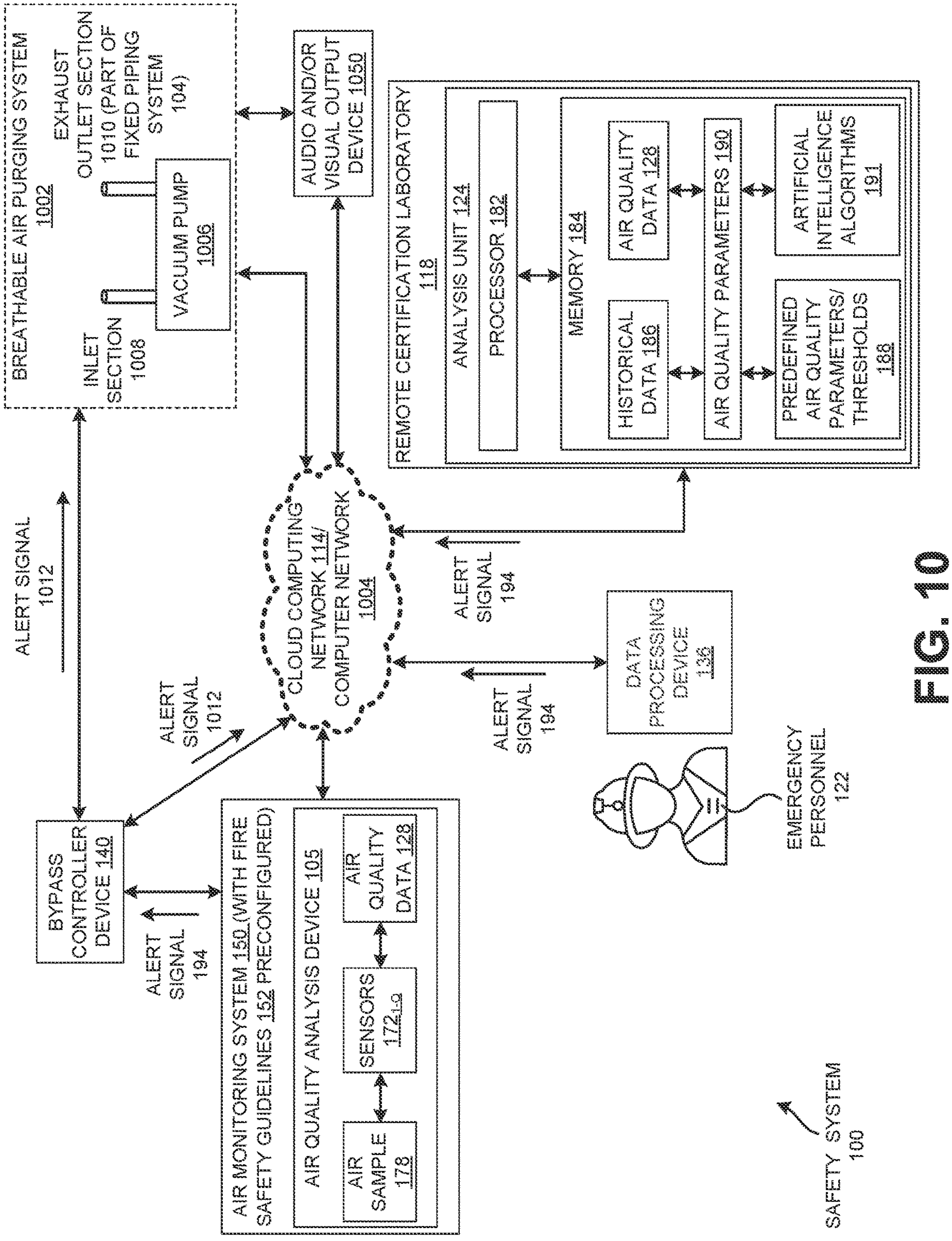
FIG. 10 is a schematic view of automatic purging of breathable air within the safety system of FIGS. 1A-B and FIG. 7, according to one or more embodiments.

FIG. 10 shows automatic purging of breathable air 103 within safety system 100, according to one or more embodiments. In one or more embodiments, as seen above, alert signal 194 (or even electrical signal 904) to activate bypass controller device 140 may further activate a breathable air purging system 1002 coupled to fixed piping system 104. It should be noted that, as discussed above, in one or more embodiments, alert signal 194 may be transmitted from remote certification laboratory 118 and air quality analysis device 105. In some embodiments, alert signal 194 may even be transmitted from data processing device 136 (e.g., a mobile device) of authorized emergency personnel 122 to activate bypass controller device 140 and/or breathable air purging system 1002. Here, in one or more embodiments, bypass controller device 140 and breathable air purging system 1002 may be wirelessly controllable based on coupling (e.g., via a computer network such as cloud computing network 114 or a computer network 1004 (e.g., a Wide Area Network (WAN), a Local Area Network (LAN), a short-range communication network)) thereof to data processing device 136, remote certification laboratory 118 and/or air quality analysis device 105.

Thus, in one or more embodiments, all discussions relevant to automatically bypassing the source (e.g., compressed air source 108, another compressed air source 109) of breathable air 103 based on sensing (e.g., the predetermined threshold based sensing through sensors $\mathbf{172}_{1\text{-}Q}$ discussed above) one or more parameter(s) (e.g., air quality parameters 190) of breathable air 103 may also be applicable to automatically purging breathable air 103 within safety system 100 or at least a portion thereof. In one or more embodiments breathable air purging system 1002 may include a vacuum pump 1006 that is electronically controllable (e.g., operable based on alert signal 194). In one or more embodiments, vacuum pump 1006 may have an inlet section 1008 to take in breathable air 103 compromised in quality (e.g., detected based on air quality parameters 190) from safety system 100 and an exhaust outlet section 1010 from which the compromised breathable air 103 is let out (e.g., as waste; in a controlled manner). In one or more embodiments, exhaust outlet section 1010 may be part of fixed piping system 104 as shown in FIG. 10.

In one or more embodiments, in response to detecting that one or more air quality parameters 190 is outside one or more predetermined threshold values (e.g., predefined air quality parameters/thresholds 188) based on the sensing discussed above through one or more sensors $\mathbf{172}_{1\text{-}Q}$, alert signal 194 may be transmitted to breathable air purging system 1002; said alert signal 194 may trigger the switching on of vacuum pump 1006 automatically. In one or more embodiments, as breathable air 103 may be input to vacuum pump 1006 based on coupling of breathable air purging system 1002 to fixed piping system 104, the switching on of vacuum pump 1006 may suck in breathable air 103 through vacuum pump 1006 via inlet section 1008.

Figure 11:
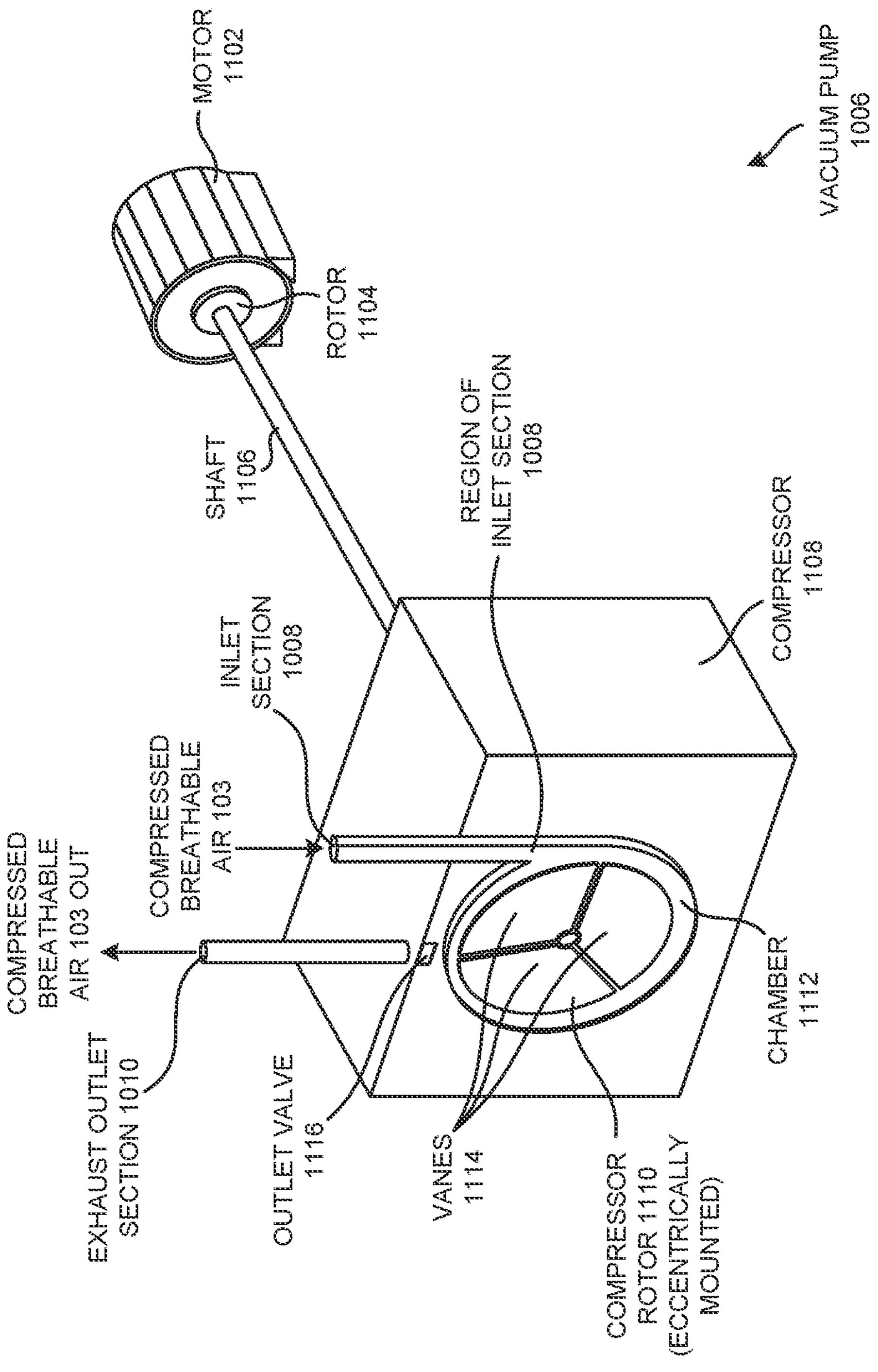
FIG. 11 is an illustrative view of a vacuum pump of a breathable air purging system of the safety system of FIGS. 1A-B, FIG. 7 and FIG. 10, according to one or more embodiments.

FIG. 11 shows vacuum pump 1006, according to one or more embodiments. In one or more embodiments, vacuum pump 1006 may be coupled across a low-pressure point of safety system 100 and a high-pressure point associated with fixed piping system 104 representing a system pressure of breathable air 103 within safety system 100. In one or more embodiments, the automatic switching/turning on of vacuum pump 1006 may supply electric current to a motor 1102 of vacuum pump 1006. In one or more embodiments, the electric current may be associated with a magnetic field that causes a rotor 1104 of motor 1102 to rotate. In one or more embodiments, the coupling of rotor 1104 to a shaft 1106 that is coupled to a compressor 1108 of vacuum pump 1006 may transfer rotational kinetic energy to compressor 1108. In one or more embodiments, compressor 1108 in turn may include a compressor rotor 1110 that is eccentrically mounted in a chamber 1112 of compressor 1108.

In one or more embodiments, the turning on of vacuum pump 1006 causes rotor 1104 and, thereby, compressor rotor 1110 to rotate. In one or more embodiments, the rotation of compressor rotor 1110 across a region of inlet section 1008 may expose a low pressure area of chamber 1112, thereby causing the compromised breathable air 103 at a higher pressure to be sucked into chamber 1112. In one or more embodiments, the continued rotation of compressor rotor 1110 may cause one or more vanes 1114 thereof to trap more of the compromised breathable air 103 within chamber 1112. In one or more embodiments, further rotation of compressor rotor 1110 may compress a volume of the compromised breathable air 103 within chamber 1112 until the pressure of the trapped compromised breathable air 103 is high enough to open an outlet valve 1116 associated with exhaust outlet section 1010.

In one or more embodiments, repetition of the operations discussed above may purge breathable air 103 out of safety system 100 utilizing vacuum pump 1006. In one or more embodiments, the purging of breathable air 103 out of safety system 100 (or at least a portion thereof) may enable the switching from one source (e.g., compressed air source 108) to another (e.g., another compressed air source 109) as a new source of clean breathable air 103, as discussed above. Thus, in one or more embodiments, alert signal 194 may control not only the automatic bypassing of the source but also the purging of breathable air 103 out of safety system 100 and the switching between sources of breathable air 103 within safety system 100.

In one or more embodiments, alert signal 194 may additionally trigger shutdown of supply of the compromised breathable air 103 to one or more components (e.g., emergency air fill stations 120$_{1-P}$) of safety system 100 to ensure that the compromised breathable air 103 is not accessed by emergency personnel 122 and/or other authorized personnel. As discussed above, for example, in response to alert signal 194, bypass controller device 140 may control isolation valves 160$_{1-P}$ associated with emergency air fill stations 120$_{1-P}$ to automatically bypass compressed air source 108 (e.g., air storage tanks 108$_{1-N}$) with respect to breathable air 103 within safety system 100; appropriate control (e.g., closing) of isolation valves 160$_{1-P}$ may shut down breathable air 103 from compressed air source 108 to emergency air fill stations 120$_{1-P}$. Thus, in one or more embodiments, the automatic purging of the compromised breathable air 103 out of safety system 100 may occur in conditions of emergency air fill stations 120$_{1-P}$ bypassing the source (e.g., compressed air source 108) of the compromised breathable air 103 or not receiving the compromised breathable air 103.

In some other embodiments, in response to alert signal 194, bypass controller device 140 may automatically bypass compressed air source 108 with respect to breathable air 103 within safety system 100, following which bypass controller device 140 may transmit another alert signal (e.g., alert signal 1012 of FIG. 10) to activate breathable air purging system 1002/vacuum pump 1006 instead of alert signal 194. Variations in implementations of vacuum pump 1006 (e.g., a two-chamber vacuum pump and/or other kinds of vacuum pumps may be employed), breathable air purging system 1002 and control mechanisms discussed herein are also within the scope of the exemplary embodiments discussed herein.

It should be noted that it may not be necessary for the entirety of the system to be purged of breathable air 103. In one or more embodiments, localized presence of sensors 172$_{1-Q}$ may enable localized sensing/detection of deviant parameters (e.g., air quality parameters 190) of breathable air 103. Thus, in some embodiments, only a portion (or, to generalize, at least a portion) of breathable air 103 may be purged from safety system 100. For example, breathable air 103 associated only with compartments/segments (e.g., one or more levels of structure 102) of safety system 100 may be automatically purged in the manner discussed above. Also, in some embodiments, accordingly, the source of breathable air 103 (e.g., compressed air source 108, another compressed air source 109) may be automatically bypassed with respect to supply of breathable air 103 across at least a portion (e.g., only a portion, the entirety of safety system 100) of safety system 100.

Referring back to FIG. 10, in one or more embodiments, initiation, occurrence and/or completion of the automatic purging, isolation/automatic bypassing of the source (e.g., compressed air source 108, another compressed air source 109) of breathable air 103 and/or the automatic switching of the source of breathable air 103 discussed above may be audibly and/or visually indicated (e.g., through an audio and/or visual output device 1050). In one or more embodiments, audio and/or visual output device 1050 may be controllable through breathable air purging system 1002, bypass controller device 140, remote certification laboratory 118 and/or data processing device 136. All reasonable variations are within the scope of the exemplary embodiments discussed herein.

Figure 12:
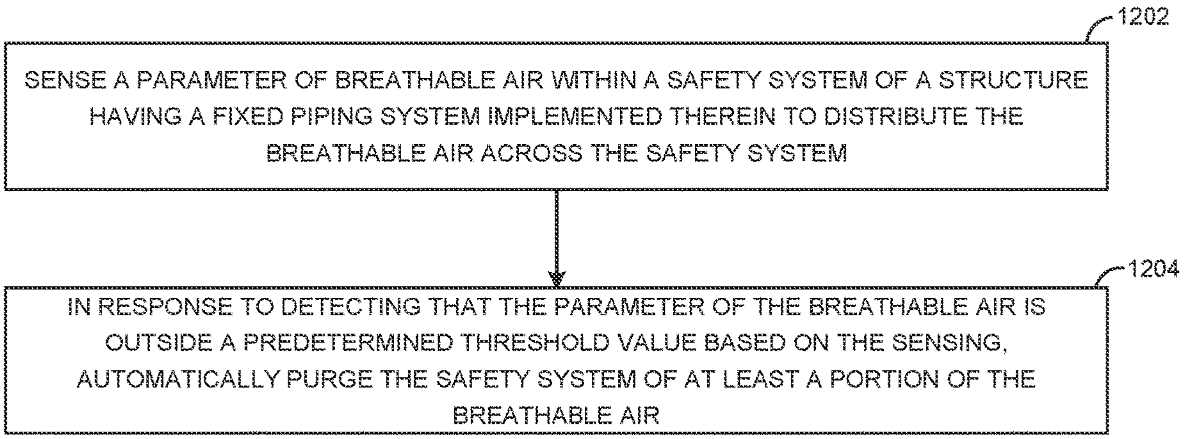
FIG. 12 is a process flow diagram detailing the operations involved in air parameter based automatic purging of breathable air within a safety system of a structure, according to one or more embodiments.

FIG. 12 shows a process flow diagram detailing the operations involved in air parameter based automatic purging of breathable air (e.g., breathable air 103) within a safety system (e.g., safety system 100) of a structure (e.g., structure 102), according to one or more embodiments. In one or more embodiments, operation 1202 may involve sensing (e.g., through one or more sensors 172$_{1-Q}$ of air quality analysis device 105) a parameter (e.g., part of air quality parameters 190) of the breathable air within the safety system. In one or more embodiments, the breathable air may be supplied via a fixed piping system (e.g., fixed piping system 104) installed within the structure. In one or more embodiments, operation 1204 may involve, in response to detecting that the parameter of the breathable air is outside a predetermined threshold value (e.g., part of predefined air quality parameters/thresholds 188) based on the sensing, automatically purging (e.g., using purge valve 1302 (discussed below) and/or vacuum pump 1006 of breathable air purging system 1002) the safety system of at least a portion of the breathable air.

Figure 13:
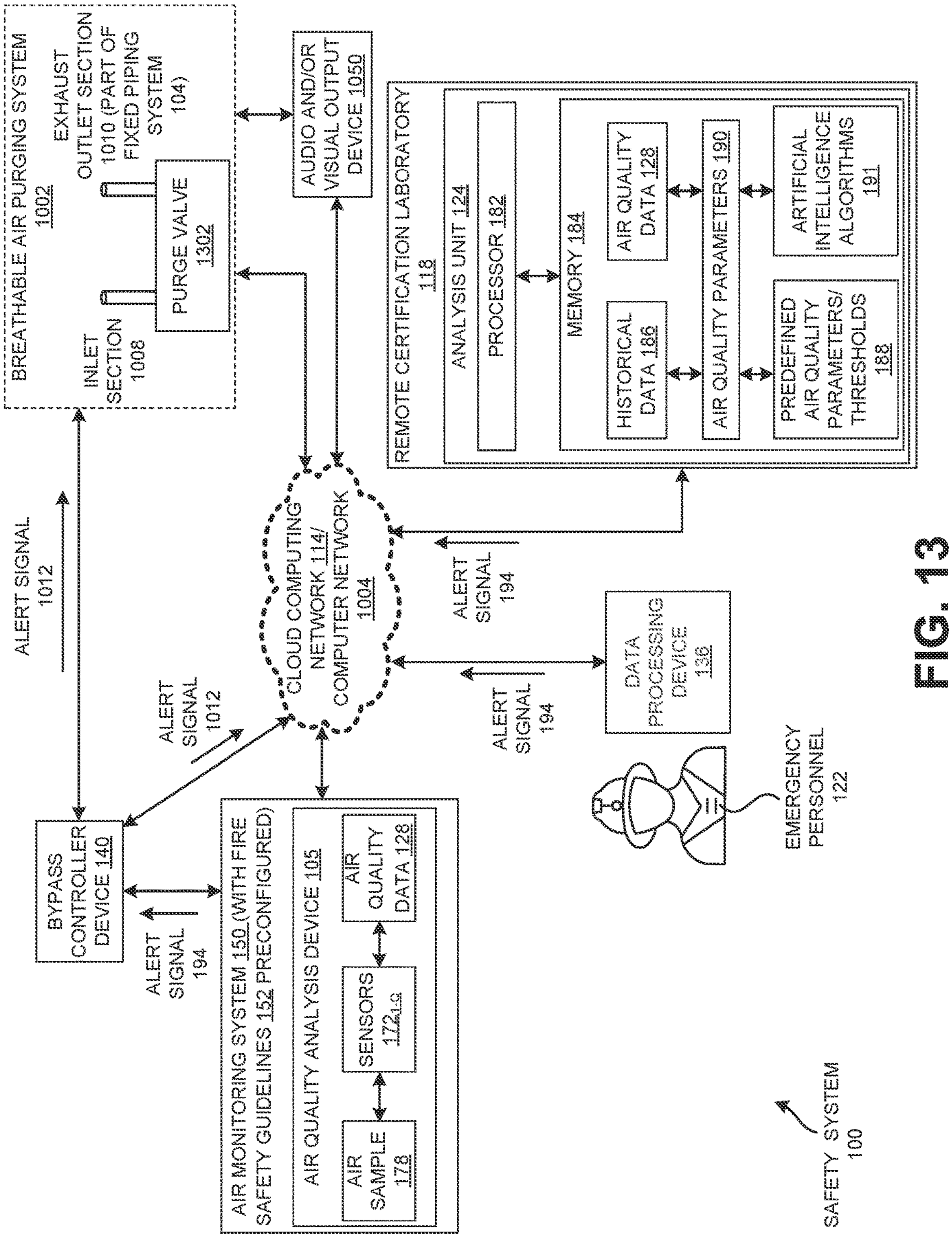
FIG. 13 is a schematic view of automatic purging of breathable air within the safety system of FIGS. 1A-B, FIG. 7 and FIG. 10 utilizing a valve instead of a vacuum pump, according to one or more embodiments.

It should be noted that the automatic purging of at least a portion of breathable air 103 from safety system 100 discussed above may not be limited to utilization of vacuum pump 1006 therefor. FIG. 13 shows utilization of a purge valve 1302 instead of vacuum pump 1006 in breathable air purging system 1002 of FIG. 10, according to one or more embodiments. In one or more embodiments, purge valve 1302 may be an isolation valve 192, a valve 902, an isolation valve $\mathbf{160}_{1\text{-}P}$ and/or another valve. In one or more embodiments, purge valve 1302 may be electronically controllable (e.g., operable based on alert signal 194) in the same manner as vacuum pump 1006 discussed above. In one or more embodiments, inlet section 1008 and exhaust outlet section 1010 (e.g., part of fixed piping system 104) may also be associated with purge valve 1302 analogous to the vacuum pump 1006 implementation. Thus, all discussions relevant to the vacuum pump 1006 based purging above may also be applicable to the purge valve 1302 based implementation of FIG. 13. Further, other kinds of automatic purging based on utilization of system air (or another gas) within safety system 100 and/or continuous point-to-point flows are also within the scope of the exemplary embodiments discussed herein. All reasonable variations are within the scope of the exemplary embodiments discussed herein.

Although the present embodiments have been described with reference to specific example embodiments, it will be evident that various modifications and changes may be made to these embodiments without departing from the broader spirit and scope of the various embodiments.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:

1. A method of a safety system of a structure having a fixed piping system installed therewithin to supply breathable air from a source across the safety system, comprising:

sensing a parameter of a portion of the breathable air within the safety system;

in response to detecting that the parameter of the portion of the breathable air is outside a predetermined threshold value based on the sensing, automatically purging the safety system of the portion of the breathable air by using a vacuum pump to suck in the portion of breathable air; and in response to the vacuum pump sucking in the portion of breathable air, automatically switching a supply of breathable air from the source of breathable air to another source of breathable air within the fixed piping system.

2. The method of claim 1, further comprising:

coupling an air analysis device along an air flow path of the breathable air from the source within the safety system;

sensing the parameter of the breathable air using a sensor associated with the air analysis device; and automatically purging the safety system of at least the portion of the breathable air based on an alert signal from one of: the air analysis device, a bypass controller device coupled to the air analysis device, and a data processing device communicatively coupled to the air analysis device through a computer network.

3. The method of claim 2, further comprising, using the bypass controller device, automatically bypassing the source of the breathable air with respect to the supply of the breathable air across at least a portion of the safety system in addition to automatically purging the safety system of at least the portion of the breathable air in response to detecting, through at least one of: the air analysis device and the data processing device, that the parameter of the breathable air is outside the predetermined threshold value based on the sensing.

4. The method of claim 3, further comprising, in response to the detection of the parameter of the breathable air being outside the predetermined threshold value based on the sensing, through the bypass controller device, switching from the source of the breathable air to another source of the breathable air in the safety system in addition to the automatic bypassing of the source of the breathable air to ensure a continued supply of the breathable air across the safety system.

5. The method of claim 4, further comprising at least one of: automatically bypassing the source of the breathable air and switching to the another source of the breathable air based on controlling, through the bypass controller device, at least one valve associated with at least one component of the safety system.

6. The method of claim 3, further comprising at least one of: audibly and visually indicating at least one of: the automatic purging of at least the portion of the breathable air and the automatic bypassing of the source of the breathable air.

7. The method of claim 2, comprising the sensor associated with the air analysis device comprising at least one of: a carbon monoxide sensor configured to sense a level of carbon monoxide in the breathable air, a carbon dioxide sensor configured to sense a level of carbon dioxide in the breathable air, an oxygen sensor configured to sense a level of oxygen in the breathable air, a nitrogen sensor configured to sense a level of nitrogen in the breathable air, a hydrocarbon sensor configured to sense a condensed hydrocarbon content in the breathable air, and a moisture sensor configured to sense a moisture concentration in the breathable air.

8. The method of claim 2, comprising automatically purging the safety system of at least the portion of the breathable air using the vacuum pump controllable based on the alert signal.

9. The method of claim 1, comprising the parameter of the breathable air comprising at least one of: an air quality parameter and an air component parameter.

10. A method of a safety system of a structure having a fixed piping system installed therewithin to supply breathable air from a source across the safety system, comprising:

sensing a parameter of a portion of the breathable air within the safety system; and in response to detecting that the parameter of the portion of the breathable air is outside a predetermined threshold value based on the sensing:

automatically bypassing the source of the breathable air with respect to the supply of the breathable air across at least a portion of the safety system;

automatically purging the safety system of the portion of the breathable air by using a vacuum pump to suck in the portion of breathable air; and in response to the vacuum pump sucking in the portion of breathable air, automatically switching a supply of breathable air from the source of breathable air to another source of breathable air within the fixed piping system.

11. The method of claim 10, further comprising:

coupling an air analysis device along an air flow path of the breathable air from the source within the safety system;

sensing the parameter of the breathable air using a sensor associated with the air analysis device;

automatically bypassing the source of the breathable air with respect to the supply of the breathable air across at least the portion of the safety system using a bypass controller device coupled to the air analysis device; and automatically purging the safety system of at least the portion of the breathable air based on an alert signal from one of: the air analysis device, the bypass controller device, and a data processing device communicatively coupled to the air analysis device through a computer network.

12. The method of claim 11, further comprising, in response to the detection of the parameter of the breathable air being outside the predetermined threshold value based on the sensing using at least one of: the air analysis device and the data processing device, through the bypass controller device, switching from the source of the breathable air to another source of the breathable air in the safety system in addition to the automatic bypassing of the source of the breathable air to ensure a continued supply of the breathable air across the safety system.

13. The method of claim 12, further comprising at least one of: automatically bypassing the source of the breathable air and switching to the another source of the breathable air based on controlling, through the bypass controller device, at least one valve associated with at least one component of the safety system.

14. The method of claim 11, comprising the sensor associated with the air analysis device comprising at least one of: a carbon monoxide sensor configured to sense a level of carbon monoxide in the breathable air, a carbon dioxide sensor configured to sense a level of carbon dioxide in the breathable air, an oxygen sensor configured to sense a level of oxygen in the breathable air, a nitrogen sensor configured to sense a level of nitrogen in the breathable air, a hydrocarbon sensor configured to sense a condensed hydrocarbon content in the breathable air, and a moisture sensor configured to sense a moisture concentration in the breathable air.

15. The method of claim 11, comprising automatically purging the safety system of at least the portion of the breathable air using the vacuum pump controllable based on the alert signal.

16. The method of claim 10, comprising the parameter of the breathable air comprising at least one of: an air quality parameter and an air component parameter.

17. The method of claim 10, further comprising at least one of: audibly and visibly indicating at least one of: the automatic purging of at least the portion of the breathable air and the automatic bypassing of the source of the breathable air.

18. A safety system of a structure, comprising:

a source of breathable air;

a fixed piping system installed within the structure for supply of the breathable air across the safety system;

an air analysis device along an air flow path of the breathable air from the source thereof, the air analysis device comprising a sensor associated therewith to sense a parameter of a portion of the breathable air within the safety system;

a vacuum pump configured to, in response to an alert signal indicative of the sensed parameter of the portion of the breathable air being outside a predetermined threshold value, suck in the portion of the breathable air to automatically purge the safety system of the portion of the breathable air; and a bypass controller device configured to, in response to the portion of the breathable air being sucked in by the vacuum pump, automatically switch a supply of breathable air from the source of breathable air to another source of breathable air within the fixed piping system.

19. The safety system of claim 18, wherein the alert signal is from one of: the air analysis device, a bypass controller device coupled to the air analysis device, and a data processing device communicatively coupled to the air analysis device through a computer network.

20. The safety system of claim 19, further comprising:

a bypass controller device communicatively coupled to the air analysis device to, in response to detecting, using at least one of: the air analysis device and the data processing device, that the parameter of the breathable air is outside the predetermined threshold value based on the sensing, automatically bypass the source of the breathable air with respect to the supply of the breathable air across at least a portion of the safety system.

21. The safety system of claim 20, wherein, in response to the detection of the parameter of the breathable air being outside the predetermined threshold, the bypass controller device further switches from the source of the breathable air to another source of the breathable air in the safety system in addition to the automatic bypassing of the source of the breathable air to ensure a continued supply of the breathable air across the safety system.

22. The safety system of claim 20, further comprising at least one of: an audio and a visual output device to at least one of: audibly and visually indicate at least one of: the automatic purging of at least the portion of the breathable air and the automatic bypassing of the source of the breathable air.

23. The safety system of claim 18, wherein the parameter of the breathable air comprises at least one of: an air quality parameter and an air component parameter.

24. The safety system of claim 18, wherein the sensor associated with the air analysis device comprises at least one of: a carbon monoxide sensor configured to sense a level of carbon monoxide in the breathable air, a carbon dioxide sensor configured to sense a level of carbon dioxide in the breathable air, an oxygen sensor configured to sense a level of oxygen in the breathable air, a nitrogen sensor configured to sense a level of nitrogen in the breathable air, a hydrocarbon sensor configured to sense a condensed hydrocarbon content in the breathable air, and a moisture sensor configured to sense a moisture concentration in the breathable air.

* * * * *